United States Patent
Ota et al.

(10) Patent No.: US 11,802,842 B2
(45) Date of Patent: Oct. 31, 2023

(54) DISPLAY CONTROL DEVICE AND STORAGE MEDIUM

(71) Applicant: SINTOKOGIO, LTD., Nagoya (JP)

(72) Inventors: Kazuhiro Ota, Toyokawa (JP); Takeshi Sonohara, Toyokawa (JP)

(73) Assignee: SINTOKOGIO, LTD., Aichi (JP)

( * ) Notice: Subject to any disclaimer, the term of this patent is extended or adjusted under 35 U.S.C. 154(b) by 0 days.

(21) Appl. No.: 17/213,383

(22) Filed: Mar. 26, 2021

(65) Prior Publication Data
US 2021/0302329 A1    Sep. 30, 2021

(30) Foreign Application Priority Data
Mar. 30, 2020    (JP) .................................. 2020-061041

(51) Int. Cl.
*G01N 21/95* (2006.01)
*B22C 23/00* (2006.01)
*B22C 9/02* (2006.01)

(52) U.S. Cl.
CPC ......... *G01N 21/9515* (2013.01); *B22C 23/00* (2013.01); *B22C 9/02* (2013.01)

(58) Field of Classification Search
CPC ......... B22C 19/04; B22C 25/00; B22C 23/00; B22C 9/02; G01N 21/9515; G01N 2021/8854; B07C 5/34; B29C 45/76
See application file for complete search history.

(56) References Cited

U.S. PATENT DOCUMENTS

| | | | |
|---|---|---|---|
| 4,409,718 A | 10/1983 | Pryor | |
| 5,075,051 A * | 12/1991 | Ito | B29C 45/76 264/40.5 |
| 5,697,424 A | 12/1997 | Ferdinandsen et al. | |

(Continued)

FOREIGN PATENT DOCUMENTS

| | | |
|---|---|---|
| CN | 105452806 A | 3/2016 |
| CN | 111161224 A | 5/2020 |

(Continued)

OTHER PUBLICATIONS

Aoki et al, Inspection Device and Casting System, WO-2018216495-A1, Nov. 2018.*

(Continued)

*Primary Examiner* — Sang H Nguyen
(74) *Attorney, Agent, or Firm* — Harness, Dickey & Pierce, P.L.C.

(57) ABSTRACT

Provided is the technique that allows an operator or the like to grasp a failure of a mold to be worked in the work area. An inspecting device inspects each of a plurality of molds conveyed along a conveyance path with use of image data generated by a sensor that captures an image of each of the plurality of molds. A display control device is configured to carry out: a storage process in which inspection results of the individual molds are stored in a memory; a determination process in which one or more molds satisfying a predetermined condition of a positional relation to a display are determined from among the plurality of molds conveyed along the conveyance path; and a display control process in which one or more inspection results of the respective one or more molds having been determined in the determination process are displayed on the display.

9 Claims, 13 Drawing Sheets

(56) References Cited

U.S. PATENT DOCUMENTS

| | | | |
|---|---|---|---|
| 6,615,159 B1 * | 9/2003 | Nishida | B22C 19/04 702/183 |
| 6,661,507 B2 | 12/2003 | Yoda et al. | |
| 2005/0225753 A1 | 10/2005 | Engelbart et al. | |
| 2007/0204555 A1 | 6/2007 | Engelbart et al. | |
| 2014/0336806 A1 | 11/2014 | Bewlay et al. | |
| 2016/0041092 A1 | 2/2016 | Urano et al. | |
| 2016/0252619 A1 | 9/2016 | Markendorf et al. | |
| 2016/0346979 A1 * | 12/2016 | Uchiyama | B29C 45/7686 |
| 2017/0014945 A1 | 1/2017 | Fraser et al. | |
| 2017/0165891 A1 * | 6/2017 | Shiraishi | B29C 45/1769 |
| 2018/0207716 A1 | 7/2018 | Larsen et al. | |
| 2019/0247917 A1 | 8/2019 | Nishida et al. | |
| 2019/0258225 A1 | 8/2019 | Link et al. | |
| 2019/0385116 A1 | 12/2019 | Vosshenrich | |
| 2021/0001399 A1 | 1/2021 | Bullied et al. | |

FOREIGN PATENT DOCUMENTS

| | | | | |
|---|---|---|---|---|
| CN | 111929309 A | 11/2020 | | |
| DE | 19542640 A1 | 5/1996 | | |
| DE | 102006009320 A1 | 9/2007 | | |
| DE | 202019004266 U1 | 11/2019 | | |
| EP | 3632650 A1 * | 4/2020 | | B29C 45/766 |
| EP | 3736064 A1 | 11/2020 | | |
| JP | H05-169244 A | 7/1993 | | |
| JP | 9-311031 | 12/1997 | | |
| JP | 2000-131242 A | 5/2000 | | |
| JP | 2004-144556 A | 5/2004 | | |
| JP | 2004/198436 A | 7/2004 | | |
| JP | 2004-334631 A | 11/2004 | | |
| JP | 2007-532910 A | 11/2007 | | |
| JP | 2010-139461 A | 6/2010 | | |
| JP | 2010-223810 A | 10/2010 | | |
| JP | 2012-045563 A | 3/2012 | | |
| JP | 2013-43185 A | 3/2013 | | |
| JP | 2018-040767 A | 3/2018 | | |
| JP | 2018075830 A * | 5/2018 | | B07C 5/34 |
| JP | 2018-520009 A | 7/2018 | | |
| JP | 2019-148497 A | 9/2019 | | |
| JP | 2019-196964 A | 11/2019 | | |
| JP | 2019-215932 A | 12/2019 | | |
| JP | 2019-217506 A | 12/2019 | | |
| JP | 2020-508275 A | 3/2020 | | |
| KR | 0933697 B1 | 12/2009 | | |
| KR | 2010-0124653 A | 11/2010 | | |
| KR | 2090103 B1 | 3/2020 | | |
| WO | WO-2017/085765 A1 | 5/2017 | | |
| WO | WO-2020/003888 A1 | 1/2020 | | |

OTHER PUBLICATIONS

Japanese Office Action and English translation thereof for JP2020-061041 dated Feb. 7, 2023.
Japanese Office Action and English translation thereof for JP2020-061043 dated Feb. 7, 2023.
U.S. Office Action for corresponding U.S. Appl. No. 17/213,361 dated Apr. 12, 2023.
U.S. Office Action for corresponding U.S. Appl. No. 17/213,381 dated Apr. 11, 2023.
Japanese Office Action and English machine translation thereof for Japanese Application No. 2020-061041 dated May 9, 2023.
U.S. Office Action for corresponding U.S. Appl. No. 17/213,377 dated May 11, 2023.
Japanese Office Action and English translation thereof for Japanese Application No. 2020-061043 dated Jul. 4, 2023.

* cited by examiner

| Pattern code | Reference image folder No. |
|---|---|
| ... | ... |
| 10 | S10 |
| 11 | S11 |
| ... | ... |
| ... | ... |

FIG. 5

| Mold ID | Pattern code | Date and time of inspection | Inspection result | |
|---|---|---|---|---|
| | | | Evaluation | Inspection result image folder No. |
| 1001 | 10 | 2019.12.01 10:30:00 | Good | K1 |
| 1002 | 11 | 2019.12.01 10:30:30 | Good | K2 |
| 1003 | 10 | 2019.12.01 10:31:00 | Good | K3 |
| 1004 | 11 | 2019.12.01 10:31:30 | No good | K4 |
| ... | ... | ... | ... | ... |
| ... | ... | ... | ... | ... |

FIG. 6

| Mold ID | Pattern code | Position | Mold inspection result | | ... |
|---|---|---|---|---|---|
| | | | Evaluation | Pouring permission/non-permission | ... |
| 1001 | 10 | P19 | Good | Permission | ... |
| 1002 | 11 | P18 | Good | Permission | ... |
| 1003 | 10 | P17 | Good | Permission | ... |
| 1004 | 11 | P16 | No good | Non-permission | ... |
| ... | ... | ... | ... | ... | ... |
| ... | ... | ... | ... | ... | ... |

| Pattern code | Local region | Repairable/irreparable |
|---|---|---|
| A | R1 | Repairable |
| | R2 | Repairable |
| | R3 | Irreparable |
| | R4 | Repairable |
| | ... | ... |
| ⋮ | ⋮ | ⋮ |

DISPLAY CONTROL DEVICE AND STORAGE MEDIUM

This Nonprovisional application claims priority under U.S.C. § 119 on Patent Application No. 2020-061041 filed in Japan on Mar. 30, 2020, the entire contents of which are hereby incorporated by reference.

TECHNICAL FIELD

The present invention relates to a display control device and a storage medium.

BACKGROUND ART

In casting, the technique of inspecting molds for failures has been proposed. For example, Patent Literature 1 discloses detecting the width of a possible gap between adjacent sand mold parts, mold expansion, and mold dimensions to assess whether or not an actual situation is acceptable. Patent Literature 1 also proposes the technique of inspecting produced castings for failures. Patent Literature 2 discloses that an abnormal ingot position of an ingot is calculated based on information on molten metal to be solidified in a mold, and the abnormal ingot position is communicated to a subsequent continuous step. Patent Literature 3 discloses that images related to the name of a mold during casting, which is the pre-processing step, and to the name and shape of a mold during shakeout are displayed by a display means installed in the post-processing step in which sprue separation or the other process is carried out.

CITATION LIST

Patent Literature

[Patent Literature 1]
Published Japanese Translation of PCT International Application, Tokuhyo, No. 2018-520009
Patent Literature 2
Japanese Patent Application Publication, Tokukai, No. 2013-43185
[Patent Literature 3]
Japanese Patent Application Publication, Tokukaihei, No. 05-169244

SUMMARY OF INVENTION

Technical Problem

In a case where a failure has occurred in a mold, it is preferable that, prior to pouring (for example, at the time when an operator who places a core carries out a placement operation or the like), the operator can grasp that the failure has occurred in the mold. In the technique disclosed in Patent Literature 1, although it is possible to assess molds, it is not possible for an operator or the like to grasp, in the work area, the failure of the mold to be worked. Further, in the techniques disclosed in Patent Literatures 2 and 3 as well, it is not possible for an operator or the like to grasp, in the work area, the failure of the mold to be worked.

It is an object of an aspect of the present invention to provide the technique which allows an operator or the like to grasp a failure of a mold to be worked in the work area.

Solution to Problem

In order to solve the above-described problem, a display control device in accordance with an aspect of the present invention includes a controller. The controller is configured to carry out a storage process in which inspection results are stored in a memory, the inspection results being each obtained by an inspection of each of a plurality of molds conveyed along a conveyance path, the inspection being carried out based on image data containing each of the plurality of molds as a subject. Further, the controller is configured to carry out a determination process in which one or more molds satisfying a predetermined condition of a positional relation to a display are determined from among the plurality of molds conveyed along the conveyance path. Further, the controller is configured to carry out a display control process in which one or more inspection results of the respective one or more molds having been determined in the determination process are displayed on the display.

Further, in order to solve the above-described problem, a computer-readable non-transitory storage medium in accordance with an aspect of the present invention stores a control program for controlling the display control device described in the above-described aspect, the control program causing the controller to carry out each of the foregoing processes.

Advantageous Effects of Invention

An aspect of the present invention allows an operator or the like to grasp, in a work area, a failure of a mold to be worked.

BRIEF DESCRIPTION OF DRAWINGS

FIG. 5 is a diagram illustrating an example of contents of an inspection result table in accordance with Embodiment 1 of the present invention.

FIG. 6 is a diagram illustrating an example of contents of a mold management table in accordance with Embodiment 1 of the present invention.

DESCRIPTION OF EMBODIMENTS

Embodiment 1

Figure 1:
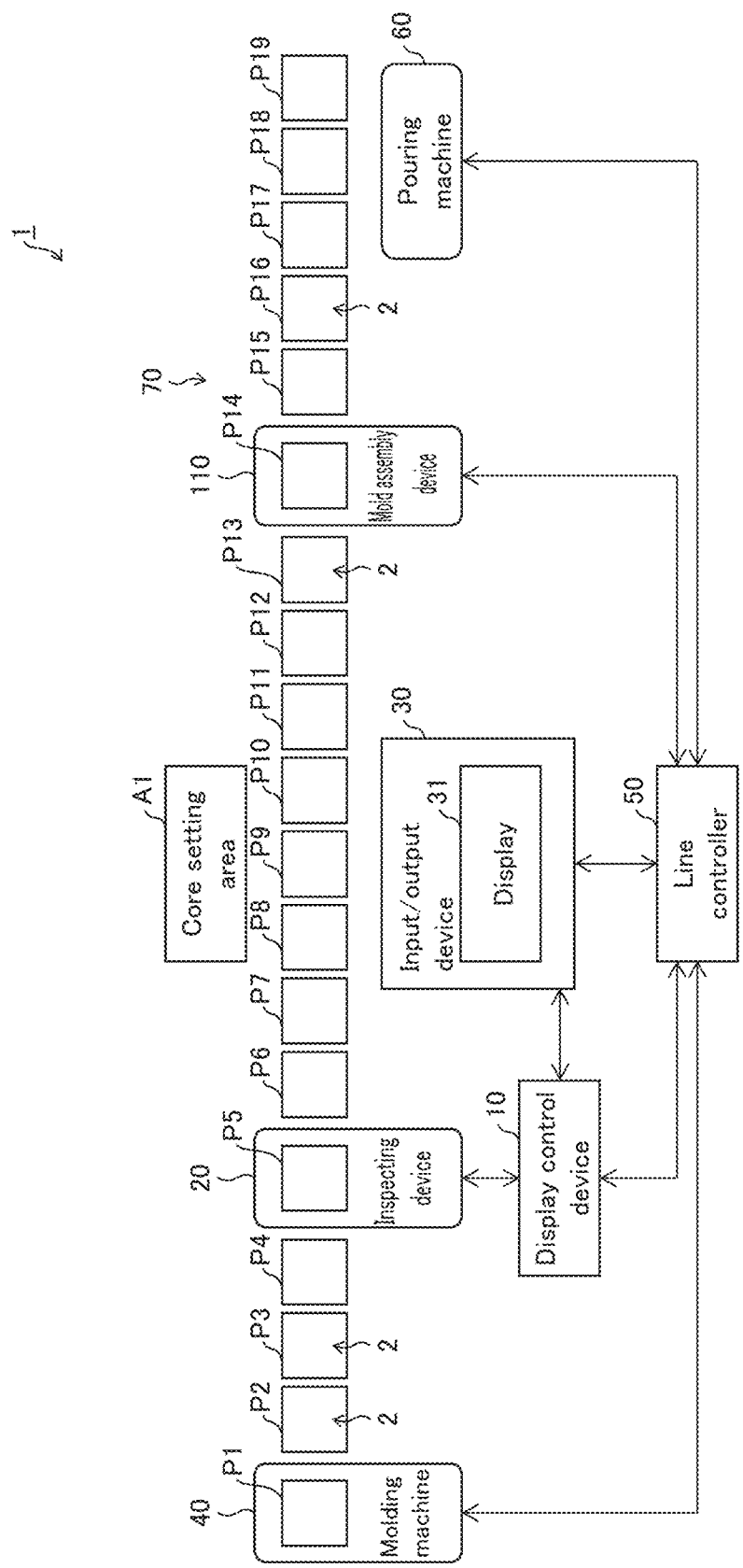
FIG. 1 is a diagram schematically illustrating a configuration of a casting system in accordance with Embodiment 1 of the present invention.

FIG. 1 is a diagram schematically illustrating a configuration of a casting system 1 that includes a display control device in accordance with an embodiment of the present invention. The casting system 1 is a system that produces castings by pouring molten metal into a plurality of molds 2 conveyed along a conveyance path. The casting system 1 includes a display control device 10, an inspecting device 20, an input/output device 30, a molding machine 40, a line controller 50, a pouring machine 60, a conveying device 70, and a mold assembly device 110.

The display control device 10 is a device that displays, on a display 31, an inspection result obtained by inspecting the molds 2 for failures during casting. The display control device 10 is, for example, a laptop or desktop personal computer. The display control device 10 may be a smart phone carried by an operator or a tablet terminal carried by the operator.

The inspecting device 20 is a device that inspects the molds 2 on the conveyance path. The inspecting device 20 includes a sensor 21 that captures respective images of the plurality of the molds 2 which are conveyed along the conveyance path. The sensor 21 is, for example, a camera. The sensor 21 captures an image of a product surface (cavity surface) of a flaskless mold before a cope and a drag conveyed along the conveyance path are assembled, and generates image data containing the mold as a subject.

The display control device 10 carries out an inspection of the molds for defects by comparing an image thus captured (hereinafter referred to as "captured image") with a reference image, and then accumulates an inspection result in an inspection result table. The cope and the drag are conveyed alternately to a core setting area.

Figure 2:
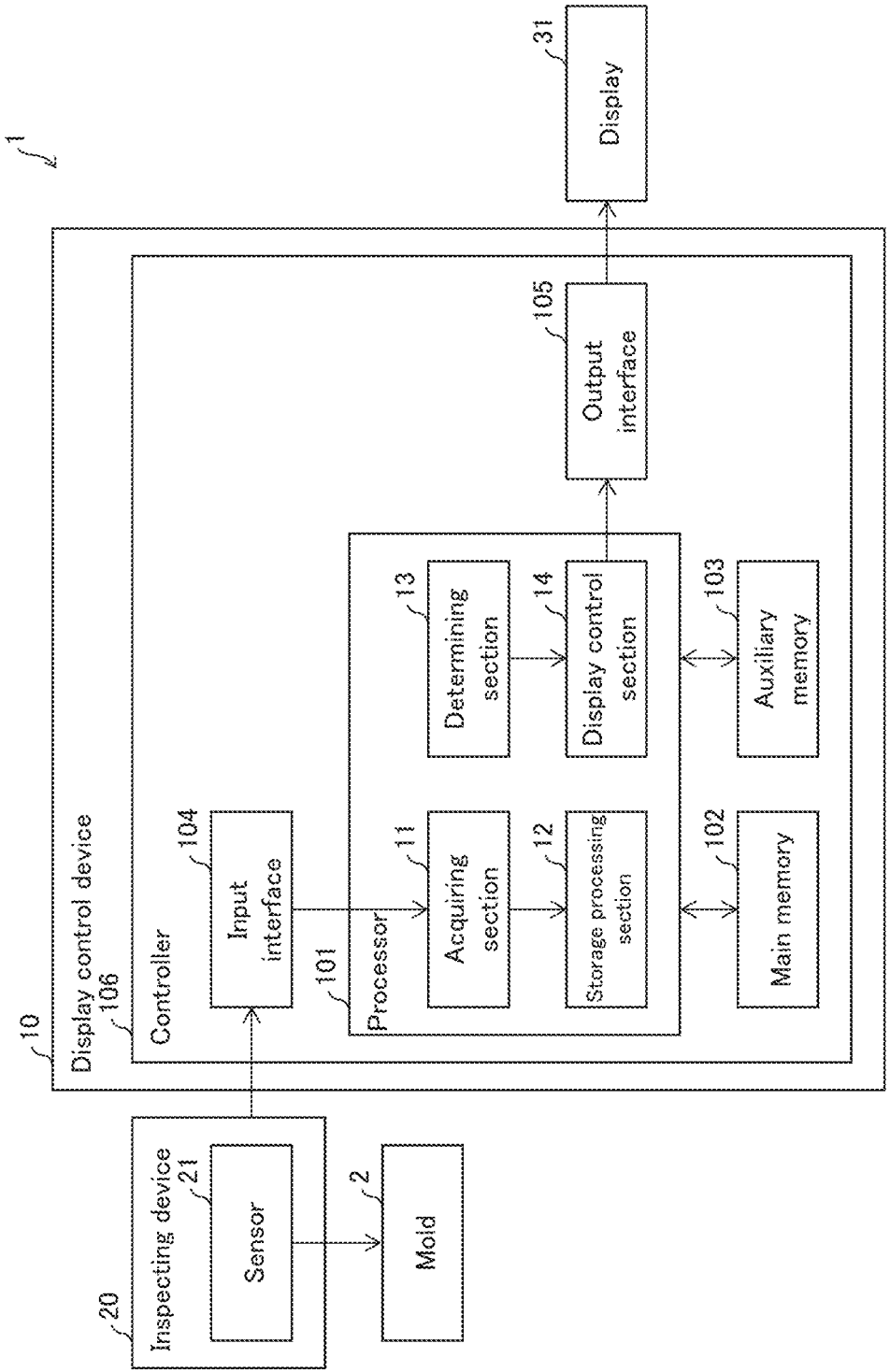
FIG. 2 is a block diagram schematically illustrating a configuration of a display control device 10 in accordance with Embodiment 1 of the present invention.

FIG. 2 is a block diagram schematically illustrating a configuration of the display control device 10. The display control device 10 includes a controller 106. The controller 106 includes a processor 101, a main memory 102, an auxiliary memory 103, an input interface 104, and an output interface 105. The processor 101 is a processor that controls the display control device 10, and is, for example, a processor such as a microprocessor, a digital signal processor, a microcontroller, or any combination of these processors. The main memory 102 and the auxiliary memory 103 (both of which are examples of a memory) are each, for example, a semiconductor random access memory (RAM). The main memory 102 and the auxiliary memory 103 may be an integral memory (physically one and the same memory) such that the main memory 102 and the auxiliary memory 103 are distinguished by region or by address in the same memory. The auxiliary memory 103 stores a program for causing the processor 101 to execute an operation of the display control device 10. The processor 101 causes a control program stored in the auxiliary memory 103 to be loaded in the main memory 102 and executes instructions contained in the loaded control program.

The main memory 102 mainly stores an application or software for mold drop evaluation. The auxiliary memory 103 stores reference image data to be referenced during inspection of the molds 2, an incoming captured image, display object data, and various other data. In the present embodiment, the auxiliary memory 103 stores a reference image table and the inspection result table. The reference image table is a table that stores, on a pattern by pattern basis, a reference image to be used when an inspection of the molds 2 is carried out. The inspection result table is a table that stores a result of a defect inspection of each of the molds 2 in association with identification information that identifies each of the molds 2.

The input interface 104 acquires the captured image from the inspecting device 20. The captured image thus acquired is stored in the auxiliary memory 103 in association with the identification information that identifies each of the molds 2. The output interface 105 outputs, to the display 31, data representing an image. Although one input interface 104 and one output interface 105 are illustrated in FIG. 2, the display control device 10 may include a plurality of input interfaces and/or a plurality of output interfaces. In this example, the processor 101 reads and executes the control program stored in the auxiliary memory 103, thereby realizing an acquiring section 11, a storage processing section 12, a determining section 13, and a display control section 14, all of which are illustrated in FIG. 2.

Figures 3, 4:
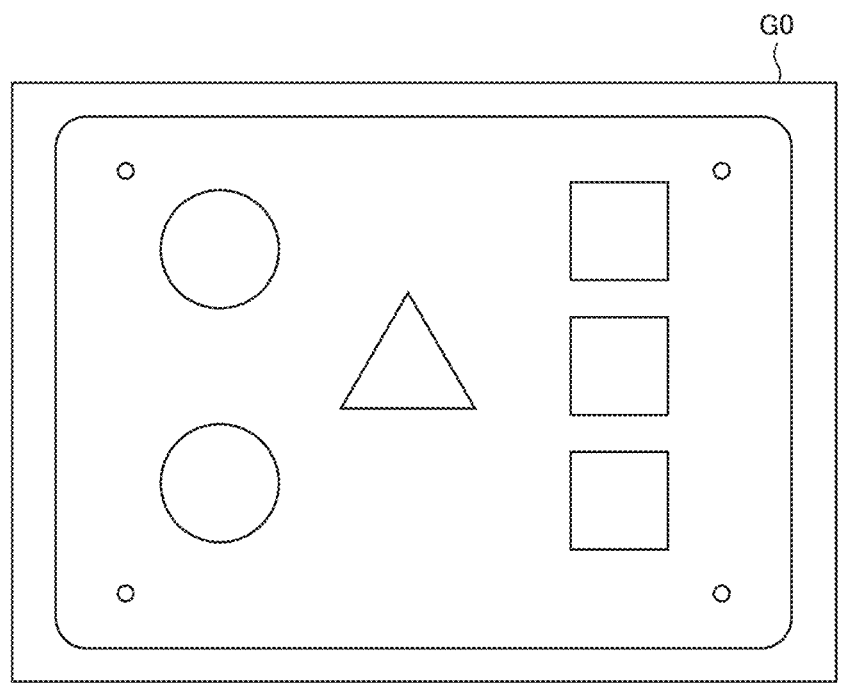
FIG. 3 is a diagram illustrating an example of contents of a reference image table in accordance with Embodiment 1 of the present invention.
FIG. 4 is a diagram illustrating an example of a reference image in accordance with Embodiment 1 of the present invention.

FIG. 3 is a diagram illustrating an example of contents of the reference image table. In the example illustrated in FIG. 3, the reference image table stores items of "pattern code" and "reference image folder No." in association with each other. Of these items, the item "pattern code" stores identification information (ID) that identifies a pattern. Pattern codes correspond to a certain pattern used for formation of molds, i.e. molds formed with use of that pattern. Among the pattern codes, for example, "10" is an ID of a drag formed by a certain pattern, and "11" is an ID of a cope to be assembled with the drag. In other words, the pattern codes distinguish a cope and a drag of a certain pattern. Therefore, when mold formation is carried out by use of the same pattern, IDs of molds flowing in the molding line consecutively alternate between the cope ID "11" and the drag ID "10" (see FIG. 5).

The item "reference image folder No." stores information indicative of a storage location of data of a reference image corresponding to that pattern. Note that the items contained in the reference image table are not limited to those described above, and other items may be contained in the reference image table. The reference image is an image obtained by capturing an image of a mold 2 formed without defects from above. By comparison between this reference image and the captured image, a check is made on the formed mold 2 for detects. In a case where a pattern code of a mold formed based on a certain pattern is "10" (drag), the display control device 10 determines the presence or absence of a defect by comparison between a reference image corresponding to "S10" as the "reference image folder No." and the captured image. Subsequently, since a mold 2 corresponding to a pattern code "11" (cope) is conveyed, the display control device 10 determines the presence or absence of a defect by comparison between a reference image stored in the reference image folder "S11" as "reference image folder No." and the captured image. The reference image table in FIG. 3 has a data structure for making a determination as to the presence or absence of a defect by such comparison between images.

FIG. 4 is a diagram illustrating an example of a reference image G0. The reference image G0 is prepared in advance and stored in the auxiliary memory 103. The reference image G0 is, for example, an image captured of a defect-free mold 2 by the inspecting device 20.

FIG. 5 is a diagram illustrating an example of contents of the inspection result table. In the example illustrated in FIG. 5, the inspection result table stores the items of "mold ID", "pattern code", "date and time of inspection", and "inspection result" in association with each other. Of these items, the item "mold ID" stores identification information that identifies a mold 2. IDs stored in the item "pattern code" are the same as the IDs stored in the "pattern code" in the reference image table described above. The item "date and time of inspection" stores information that indicates the date and time when a defect inspection was carried out. The item "inspection result" stores information that indicates a result of a defect inspection.

The item "inspection result" includes items of "evaluation" and "inspection result image folder No". The item "evaluation" stores information that indicates an evaluation result of a defect inspection. The evaluation of the defect inspection is carried out by comparison between a reference image and a captured image which are stored in the auxiliary memory 103, and is performed by the program of the display control device 10. As described above, the data table in FIG. 5 is stored in the auxiliary memory 103 of the display control device 10. The information indicating the evaluation result is, for example, "GOOD", "NO GOOD", or "FAIL". "GOOD" indicates that the mold 2 is normal. "NO GOOD" indicates that the mold 2 is abnormal (has a defect). "FAIL" indicates that the inspection itself failed. The item "inspection result image folder No." stores information that indicates a storage location of an image (hereinafter referred to as "inspection result image") representing the result of the defect inspection of the mold 2. As described above, the auxiliary memory 103 of the display control device 10 stores the result of the inspection of the mold 2 in association with the identification information that identifies the mold 2. Note that the items contained in the inspection result table are not limited to those described above, and other items may be contained in the inspection result table. For example, the inspection result may contain data representing a defect of a mold. The data representing a defect of the mold is data that represents at least one of, for example, a position of a defect, a shape thereof, and a size thereof.

Referring back to FIG. 2, the display control device 10 includes the acquiring section 11, the storage processing section 12, the determining section 13, and the display control section 14. The acquiring section 11 carries out an acquisition process of acquiring a captured image from the inspecting device 20. The acquiring section 11 also generates an inspection result which is obtained by an inspection of the mold based on the captured image. The captured image is sequentially inputted to the input interface 104 and is stored in the auxiliary memory 103 by the processor 101. The acquiring section 11 makes comparison between the reference image and the captured image which are stored in the auxiliary memory 103, thereby determining the size of a defect and generating a superimposed image according to the size of the defect. The superimposed image thus generated is displayed on the display 31. Such a program is stored in the auxiliary memory 103, and the processor 101 carries out a sequence of operations for image processing in accordance with the program stored in the auxiliary memory 103. The superimposed image is an example of the inspection result of the mold.

The acquiring section 11 compares the captured image with the reference image, localize a defective part according to a result of the comparison, determines a size of the defective part in relation to a threshold value, determines an object to be superimposed on the image according to a result of the size determination, and then generates a composite image in which the object is superimposed on the captured image. The composite image thus generated is temporarily stored in the memory by the storage processing section 12 (to go into a state of waiting to be read). The composite image waiting to be read is displayed on the display 31 by being triggered by the line controller 50 at a timing at which the composite image is to be displayed (specifically, at a timing at which a mold for which a corresponding image is to be displayed comes to the core work area).

The storage processing section 12 carries out a storage process in which an inspection result is stored in the memory. The memory in which the inspection result is stored includes, for example, the auxiliary memory 103 of the display control device 10 or an auxiliary memory provided in other device (e.g., a line controller). The inspection result includes, for example, data indicating the position and degree of a defect of the mold 2.

The determining section 13 carries out a determination process in which one or more molds satisfying a predetermined condition of a positional relation to the display 31 are determined from among a plurality of molds 2 conveyed along the conveyance path. The predetermined condition is, for example, a condition that a distance to the display 31 is less than a preset threshold, a condition that a distance to the display 31 is shortest, or a condition that a mold is located in front of the display 31. The display control section 14 causes an inspection result of a mold 2 which has been determined in the determination process to be displayed on the display 31.

According to the above-described configuration, one or more inspection results of respective one or more molds satisfying a predetermined condition of a positional relation to the display 31 among a plurality of molds 2 conveyed along the conveyance path is displayed on the display 31. This allows an operator who is present near the display 31 to grasp the inspection result(s) of the mold(s) 2 to be worked from the contents displayed on the display 31.

Note that, although it is described in this embodiment that the inspecting device 20 and the display control device 10 are separate devices, the inspecting device 20 and the display control device 10 may be configured to be an integral device. That is, the inspecting device 20 may have a function related to the display control device 10. Further, the above-described display control device 10 may be realized by cooperation of a plurality of separate devices. For example, a first device including the acquiring section 11 and the storage processing section 12 and a second device including the determining section 13 and the display control section 14 may be configured to be separate devices.

Referring back to FIG. 1, the molding machine 40 is a device that produces molds 2. The molding machine 40 forms the cope and the drag alternately, and the conveying device 70 conveys the cope and the drag alternately. The molding machine 40 receives information on a mold 2 (hereinafter referred to as "mold information") from the line controller 50, and produces a mold 2 which is indicated by a pattern code included in the received mold information. The pattern code is information that uniquely represents a mold formation pattern. The molding machine 40 charges sand into a molding flask (not illustrated) which is set together with a pattern (not illustrated), and compacts the sand by pressing the sand in the molding flask. The molding machine 40 forms a mold 2 by removing the pattern from the compacted sand. Each time the molding machine 40 forms a mold 2, the molding machine 40 transmits mold feed information to the line controller 50. Each time the line controller 50 receives the mold feed information from the molding machine 40, the line controller 50 generates mold information, which will be described later, and registers the generated mold information in a mold management table.

The input/output device 30 is a device for an operator to carry out various operations. The input/output device 30 includes an operating section (not illustrated) which is operated by the operator and the display 31 on which the inspection result of the mold 2 is displayed. The input/output device 30 includes, in addition to the display 31, an input means (for example, an OK/Cancel button, an OK/Cancel button displayed on a display or a touch panel, or the like) or an input device for inputting OK/Cancel by sound. Through the input means or the input device, an operator who is present in the core setting area provides an instruction as to whether or not to permit pouring after the operator visually checks an imaging inspection result displayed on the display 31 and makes a judgment as to whether or not a defect is so severe that pouring should be stopped and whether a defect determined by an image evaluation is acceptable to an extent that pouring is permitted through the visual check and from the operator's experience. The input/output device 30 is installed in a place corresponding to a step which is provided downstream of a place where image capture is carried out by the sensor 21 of the inspecting device 20. In the example illustrated in FIG. 1, the input/output device 30 is installed in a core setting area A1.

The display 31 is, for example, a liquid crystal display, and shows a screen in accordance with data supplied from the display control device 10. The display 31 may be, for example, a display device installed in a core setting area of the mold 2, or may be, for example, a liquid crystal display which is included in a smartphone carried by the operator or in a tablet terminal carried by the operator. Alternatively, the display 31 may be a wearable computer such as a smart glass. Although, in the example illustrated in FIG. 1, the display control device 10 and the display 31 are separate devices, the display control device 10 may be configured to include the display 31.

The line controller 50 is a controller that carries out overall control of the casting system 1. In this embodiment, the line controller 50 controls, in particular, the molding machine 40, the pouring machine 60, and the conveying device 70. The position of a mold 2 flowing through the line is collectively managed by the line controller 50.

The pouring machine 60 is a device that pours molten metal into a mold 2. The pouring machine 60 pours molten metal (carries out pouring) into a mold 2, as a pouring target, located in the pouring area, in accordance with a control signal transmitted from the line controller 50. The pouring machine 60 determines whether or not pouring is permitted in accordance with a control signal received from the line controller 50. In a case where the pouring machine 60 determines that pouring is not permitted, the pouring machine 60 does not carry out pouring into the mold 2.

The conveying device 70 is a device that carries molds 2 from the molding machine 40 to the pouring machine 60. The conveying device 70 has, for example, a roller conveyor (not illustrated) or a rail (not illustrated) to sequentially convey a plurality of molds 2 along a conveyance path on the roller conveyor or the rail. The conveying device 70 carries each of the molds 2 in accordance with a control signal transmitted from the line controller 50.

The core setting area A1 is provided between the inspecting device 20 and the pouring machine 60. In the core setting area A1, an operator is present to set cores in molds 2.

Prior to the pouring, upper and lower flasks for the molds (the cope and the drag) having passed through the core setting area A1 are assembled by the mold assembly device 110 which assembles the upper and lower flasks. As a method of assembling the upper and lower flasks, for example, a method of lifting the upper flask, inverting the upper flask, and placing the upper flask on the lower flask is used.

The assembled upper and lower flasks are conveyed to the pouring area by the conveying device 70. When the assembled upper and lower flasks enter the pouring area, a determination as to whether or not pouring is permitted is made based on the mold management table (described later) in the line controller 50, prior to the pouring. In a case where either the cope or the drag is visually evaluated to be no good, the pouring machine 60 is controlled, based on the signal from the line controller 50, so as not to carry out pouring.

Note that although the case where the molding machine 40 alternately forms copes and drags has been described in the present embodiment, a method of forming molds is not limited to such a method. Alternatively, the molding machine 40 may be configured to form a cope and a drag at a time so that these two molds 2 are conveyed in groups of two (i.e., the cope and the drag are conveyed as a set). In this case, two molding machines 40 and two inspecting devices 20 are provided. Further, the conveying device 70 carries the molds 2 in groups of two.

In this case, the cope and the drag are subjected to image capture at once, the captured images of the cope and the drag are compared with two reference images at a time, and the results of the inspections of the cope and the drag are displayed on the display 31. An operator in charge of cores looks at these two images and judges whether or not to permit pouring.

The line controller 50 has the mold management table for managing mold information. The mold management table is stored in, for example, an auxiliary memory of the line controller 50. The mold information is information on a mold 2 and includes, for example, identification information that identifies the mold 2 and position information that indicates a position of the mold 2 on the conveyance path. That is, the mold management table stores the identification information of the mold 2 in association with the position information of the mold 2. FIG. 6 is a diagram illustrating an example of contents of the mold management table. The mold management table stores the mold information in which the items of, for example, "mold ID", "pattern code", "position", and "mold inspection result" are associated with each other. Of these items, the item "mold ID" stores identification information that identifies a mold 2. The item "pattern code" stores identification information that identifies a pattern (mold formation pattern) which is used to produce a mold 2 identified by the corresponding mold ID.

The item "position" stores information indicating the position of the mold 2 identified by the corresponding mold ID on the conveyance path (hereinafter referred to as "position information"). In this embodiment, positions P1 to P19 are set as the position of the mold 2 on the conveyance path. This position information, P, is sequentially incremented in the order from P1 to P19 when one mold 2 is formed by the molding machine 40 and then conveyed by one. The position P1 is located most upstream in a conveyance direction of the conveying device 70 and is followed by the position P2, the position P3, and the like position information, which are assigned to positions downstream of the position P1. The position P1 is a position at which mold formation is carried out by the molding machine 40. The positions P2 to P4 are positions between the molding machine 40 and the inspecting device 20. The position P5 is a position at which image capture is carried out by the inspecting device 20. The positions P6 to P17 are positions between the inspecting device 20 and the pouring machine 60. The position P9 is a position in front of the display 31. The position P18 is a position at which pouring of molten metal is carried out by the pouring machine 60. The position P19 is a position at which the molding flask containing the mold 2 into which the molten metal has been poured is taken out.

The conveying device 70 sequentially moves a plurality of molds 2 on the conveyance path, and outputs, each time the molds 2 are moved, a signal indicating that the movement is completed (hereinafter referred to as a "flask feed completion signal"). Each time a plurality of molds 2 are moved on the conveyance path, the line controller 50 carries out an update process in which the position information which is associated with the identification information of each of the molds 2 is updated. In this embodiment, each time the flask feed completion signal is received from the conveying device 70, the "position information" included in the mold information, which is stored in the mold management table, is incremented by one, and new mold information is added to the mold management table. The position information indicating the position P1 is stored in "position" of the added mold information. Note that, when the molding flask at the position P19 is fed, it means that the molding flask will be taken out of the casting system 1.

That is, the line controller 50 generates new mold information when the mold 2 is formed. Further, when the mold 2 is ejected after the formation of the mold 2 is completed, the conveying device 70 moves one mold 2. Accordingly, all of the other molds 2 on the line are moved by one mold, and the position information (P1, P2, . . . , PN) of each of the molds 2 is incremented sequentially. The incremented position information is stored in the mold information table of the line controller 50. The line controller 50 keeps track of the locations of all of the molds 2 on the line from the position information stored in the mold management table.

The item "mold inspection result" includes items of "evaluation" and "pouring permission/non-permission". The item "evaluation" stores information that indicates an evaluation result of a defect inspection. The information stored in the item "evaluation" is the same as the information stored in the item "evaluation" in the inspection result table of the display control device 10.

The item "pouring permission/non-permission" stores information that indicates whether or not pouring is to be carried out (hereinafter referred to as "pouring permission/non-permission information"). In the present embodiment, an operator who sets cores makes a judgment as to whether or not to permit pouring into the mold 2, by visually checking an inspection result displayed on the display 31. To make a judgment as to whether or not to permit pouring into the mold 2, the operator assesses whether or not pouring into the mold 2 would cause a defect in a resulting casting, through visual check of the inspection result displayed on the display 31. The operator enters a result of the judgment by means of the input/output device 30. The input/output device 30 transmits the pouring permission/non-permission information to the line controller 50 in response to the operation of the operator. The line controller 50 causes the pouring permission/non-permission information received from the input/output device 30 to be stored in the item "pouring permission/non-permission" of the mold management table. The line controller 50 transmits a control signal to the pouring machine 60 in accordance with the information stored in the item "pouring permission/non-permission" of the mold management table. Note that the items contained in the mold management table are not limited to those described above, and other items may be contained in the mold management table.

(Operations)

Figure 7:
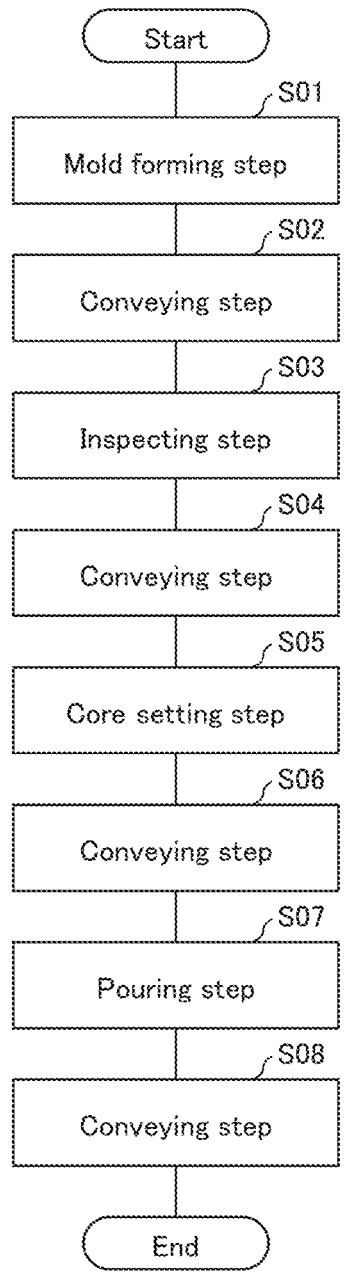
FIG. 7 is a process chart illustrating a production process of a casting in the casting system in accordance with Embodiment 1 of the present invention.

FIG. 7 is a process chart illustrating a production process of a casting in the casting system 1. In a mold forming step S01, the line controller 50 transmits a control signal for instructing the molding machine 40 to form a mold and the mold information of the position P. The molding machine 40 produces a mold 2 of the type indicated by a pattern code which is included in the mold data received from the line controller 50.

In a conveying step S02, the line controller 50 transmits, to the conveying device 70, a control signal for instructing the conveying device 70 to convey molds 2 by one pitch (hereinafter referred to as "conveyance instruction signal"). Each time the conveying device 70 receives the conveyance instruction signal from the line controller 50, the conveying device 70 carries out control to convey the mold 2 on the conveyance path one pitch at a time. When the conveyance of the mold 2 is completed, the conveying device 70 transmits the flask feed completion signal to the line controller 50. Each time the line controller 50 receives the flask feed completion signal from the conveying device 70, the line controller 50 updates position information contained in the mold information of the molds 2 on the conveyance path. The molds 2 on the conveyance path are moved one pitch at a time by the conveying device 70. By repeating such a movement, the mold 2 located at the position of the molding machine 40 is moved to the position of the inspecting device 20.

In an inspecting step S03, the sensor 21 of the inspecting device 20 performs image capture (imaging) of the mold 2 formed in the molding flask and located in the inspection area (position P5). In the present embodiment, the sensor 21 captures an image of the mold 2 having been moved to the position P5 from above the mold 2. An image capture range of the sensor 21 is preset such that an image of at least a surface (entire upper surface) of the mold 2 located at the position P5 is captured. The display control device 10 performs an inspection of the mold 2 with use of the pattern code which is contained in the mold information of the mold 2 located at the position P5 and generated data of the captured image.

The inspection of the mold 2 is performed, for example, in a manner as described below. The display control device 10 carries out a process in which a defective part is identified by generating a subtraction image that represents a difference between the image captured by the sensor 21 and the pre-registered reference image, and subjecting the generated subtraction image to particle analysis to detect a mass (blob) within the subtraction image.

The display control device 10 causes an inspection result to be stored in the auxiliary memory 103 of the display control device 10. The inspection result includes, for example, image data that represents the identified defective part. By repeating such a storage process, inspection results of a plurality of molds 2 are accumulated in the auxiliary memory 103.

In a conveying step S04, the line controller 50 carries out the same process as in the conveying step S02 to convey the molds 2 on the conveyance path one pitch at a time. The molds 2 on the conveyance path are moved one pitch at a time by the conveying device 70. By repeating such a movement, the mold 2 located at the position of the inspecting device 20 is moved to the core setting area A1.

In a core setting step S05, the display control device 10 causes an inspection result of a mold 2 formed in the molding flask and located at the position P9 to be displayed on the display 31. The display 31 keeps displaying the inspection result while the mold 2 is stopped in the core setting area A1. The operator in the core setting area A1 sets a core in the mold 2 in accordance with the inspection result, of that mold 2, displayed on the display 31. For example, the operator performs the following operation: The operator sets the core in the mold 2 which has been determined to be normal based on the inspection result, but does not set the core in the mold 2 which has been determined to be abnormal based on the inspection result. In addition to such an operation for setting the core, the operator performs a pouring permission/non-permission manipulation in which pouring is permitted in a case where the operator has assessed the mold 2 to be normal by visual check, and is not permitted in a case where the operator has assessed the mold 2 to be abnormal by visual check.

In a conveying step S06, the line controller 50 carries out the same process as in the conveying step S02 to convey the molds 2 on the conveyance path one pitch at a time. The molds 2 on the conveyance path are moved one pitch at a time by the conveying device 70. By repeating such a movement, the mold 2 in the core setting area A1 is moved to the position of the pouring machine 60.

In a pouring step S07, the line controller 50 transmits, to the pouring machine 60, a control signal for providing an instruction to carry out pouring and the mold information. The pouring machine 60 carries out pouring based on the pattern code contained in the mold information in accordance with the control signal received from the line controller 50. At this time, in a case where the mold 2 has been determined to be normal based on the inspection result, the line controller 50 transmits a control signal for instructing the pouring machine 60 to carry out pouring into the mold 2. On the other hand, in a case where the mold 2 has been determined to be abnormal based on the inspection result, the line controller 50 transmits a control signal for instructing the pouring machine 60 not to carry out pouring into the mold 2.

In a conveying step S08, the line controller 50 carries out the same process as in the conveying step S02 to convey the molds 2 on the conveyance path one pitch at a time. The molds 2 on the conveyance path are moved one pitch at a time by the conveying device 70. By repeating such a movement, the mold having been subjected to pouring at the position of the pouring machine 60 is taken out of the casting system 1.

As described above, in the casting system 1, the molding machine 40 produces the mold 2, and the display control device 10 inspects the mold 2. Then, the core is set in the mold 2 having been determined to be normal based on the inspection result, and thereafter, the pouring machine 60 carries out pouring into the mold 2 with the core set therein. Further, in the casting system 1, a plurality of molds 2 are conveyed in order from the position P1 to the position P19 by the conveying device 70. That is, the molding step S01 for one mold 2, the inspecting step S03 for another mold 2, and the core setting step S05 for still another mold 2, and the pouring step S07 for yet another mold 2 are carried out in parallel.

Figure 8:
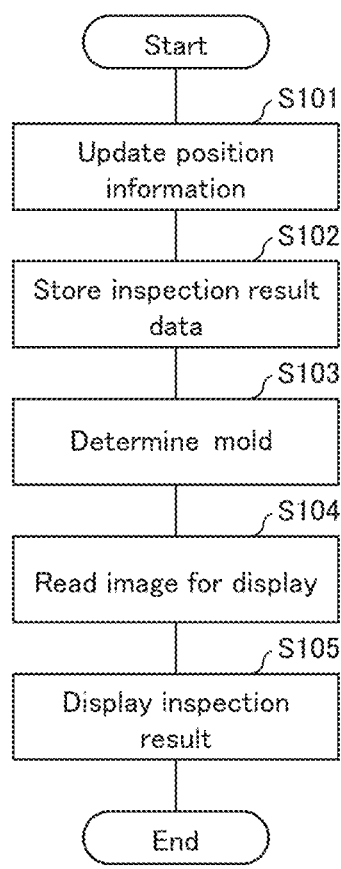
FIG. 8 is a flowchart illustrating an example of a flow of an inspection result display process carried out by a display control device and a line controller in accordance with Embodiment 1 of the present invention.

FIG. 8 is a flowchart illustrating an example of a flow of an inspection result display process carried out by the display control device 10 and the line controller 50. Note that some steps may be carried out in parallel or in a different order.

In the present embodiment, the identification information of the mold 2 in front of the operator in the core setting area A1 is grasped by the line control 50 because of its position in relation to the core setting area A1. To cause an image of the inspection result of the mold 2 in front of the operator in the core setting area A1 to be displayed on the display 31 in the core setting area A1, the line controller 50 transmits, to the display control device 10, the identification information of the mold 2 so that the display control device 10 reads the inspection image of the mold 2 in front of the operator in the core setting area A1.

In step S101, each time a plurality of molds 2 are moved on the conveyance path, the line controller 50 updates the position information which is associated with inspection results of the molds 2.

In step S102, the storage processing section 12 causes inspection result data, which indicates the inspection result of the mold 2 having been inspected with use of the image captured by the sensor 21, to be associated with the identification information of the mold 2 and stored in the auxiliary memory 103 of the display control device 10. The inspection result contains, for example, image data representing a defective part identified by the display control device 10. This storage process is repeated each time a mold 2 is inspected, and consequently, inspection results of a plurality of molds 2 are accumulated in the auxiliary memory 103.

In step S103, the line controller 50 determines the mold 2 for which the inspection result is to be displayed. In the present embodiment, the line controller 50 determines a mold 2 satisfying a predetermined condition of a positional relation to the display 31 from among a plurality of molds 2 conveyed along the conveyance path. In this embodiment, the determining section 13 determines, to be the mold 2 satisfying a predetermined condition, a mold 2 with which position information indicative of a position closest to the display 31 (position information of the position P9) is associated. Note that the line controller 50 may determine a plurality of molds 2 to be molds 2 for which inspection results are to be displayed. For example, the line controller 50 may determine one or more molds 2 which are located at a distance of not more than a threshold from the display 31 to be the mold 2 satisfying a predetermined condition. The line controller 50 transmits, to the display control device 10, the identification information of the determined mold 2. The display control device 10 receives the identification information from the line controller 50. The determining section 13 of the display control device 10 determines the mold 2 corresponding to the received identification information to be the mold 2 for which the inspection result is to be displayed.

In step S104, the determining section 13 reads, from the auxiliary memory 103, the inspection result image (composite image for display) of the determined mold 2. In the present embodiment, the display control device 10 reads the inspection result image stored in the auxiliary memory 103 (composite image in which an object display is superimposed on a mold drop part on a captured image based on a difference obtained by comparison between the captured image and the reference image) based on the identification information from the line controller 50, and transmits that image data for display to the input/output device 30. The input/output device 30 causes that inspection result image to be displayed on the display 31.

In step S105, the display control section 14 causes the inspection result indicated by the mold information of the determined mold to be displayed on the display 31. That is, the inspection result of the mold 2 which is closest to the display 31 is displayed on the display 31. Note inspection results of a plurality of molds 2 may be displayed on the display 31.

Figure 9:
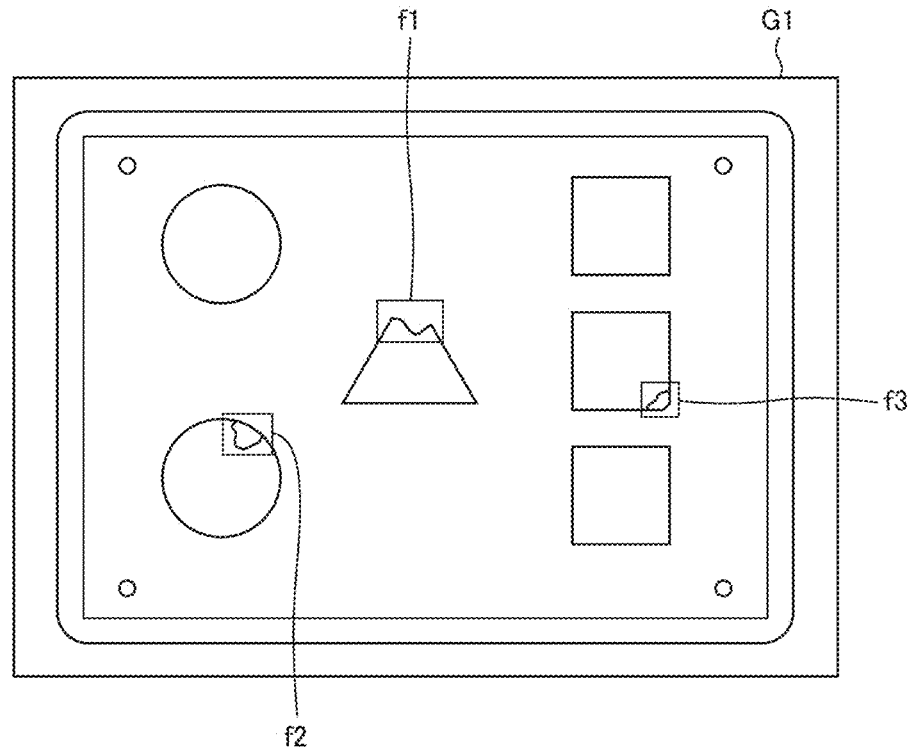
FIG. 9 is a view illustrating an example of a screen displayed on a display.

FIG. 9 is a view illustrating an example of a screen displayed on the display 31. In a screen G1, rectangular images f1 to f3 are displayed in respective regions corresponding to detected defects. In this example, displaying a rectangular figure equivalent to the size of a part where a defect has been detected in a state of being superimposed on the captured image, indicates at which position the defect has been detected and how large the detected defect is. A method of displaying the inspection result is not limited to the method described above, and the inspection result may be displayed by other screen.

Incidentally, in the image-based mold drop evaluation made on a good/no good basis by the inspecting device 20, even a part which does not need to be regarded as no good (mold drop) (e.g., a part, called sprue runner, which will be separated from a casting product) may be regarded as no good, depending on the shape of the mold 2. In a case where such a negative evaluation result (no good) is taken over as is and pouring is not permitted, the yield in the entire line is reduced.

Conversely, relatively small defects of a mold which is regarded as good in the image-based mold drop evaluation made by the inspecting device 20 include an unacceptable defect that may cause a product failure of an actual casting product. In a case where a casting is produced by carrying out pouring into such a mold, a defective rate increases, and the yield in the entire line is reduced.

Therefore, a determination as to whether to carry out pouring into that mold needs to be made not only by image-based mechanical evaluation but also by final evaluation made by the operator through a visual check with reference to information on the image-based evaluation.

The operator in the casting line is basically present only in the core setting area A1 or around the pouring machine 60. In a current casting line, it is the operator in the core setting area A1 that can visually check a mold drop.

Meanwhile, the inspecting device 20 for making the image-based mold drop evaluation carries out image capture at a position slightly short of the core setting area A1, and then makes an evaluation on a good/no good basis. To display and present, to the operator in the core setting area A1, an image representing a result of evaluation (evaluation result) of a target mold 2 which is located in front of the operator, the image representing the evaluation result, which has been stored in advance, of the target mold 2 is retrieved from the inspection result table of the display control device 10 and is displayed on the display 31 at the point in time when the target mold 2 arrives at the core setting area A1, in response to the position control signal from the line controller 50.

While viewing the image displayed on the display 31, the operator in the core setting area A1 makes a visual check on an image of the target mold in front of the operator, particularly a part indicated as a mold drop (no good), and evaluates whether or not the no-good result of the image-based evaluation is taken over as is and whether pouring into the target mold would not cause any problem. The operator enters a result (good or no good) of the evaluation that he/she made by means of the operating section of the input/output device 30.

The operator's entry of the visual evaluation result may be made via two simple two buttons, via keys of a personal computer, or by voice input, or various input means known in the art can be employed. The operator in the core setting area A1 cannot spare much time for the entry of the result of the visual mold drop evaluation since the operator not only sets cores but also carries out various kinds of operations prior to the mold assembly. For this reason, it is preferable to be able to easily enter the visual evaluation result.

The visual evaluation result (good or no good) having been entered by the operator is transmitted to the line controller 50 and stored as the visual evaluation result in the mold management table.

Figure 10:
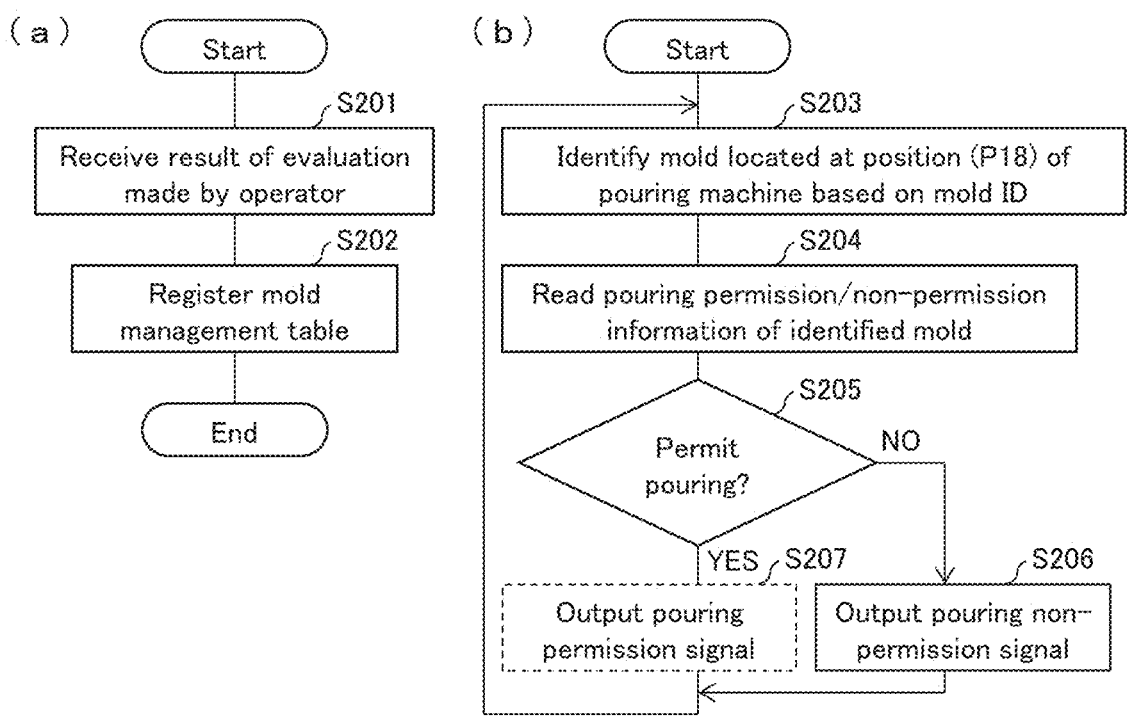
FIG. 10 is a flowchart illustrating an example of a flow of a process carried out by the line controller in accordance with Embodiment 1 of the present invention.

(a) of FIG. 10 illustrates a flowchart of a process of updating the mold management table in the line controller 50. Note that some steps may be carried out in parallel or in a different order.

In step S201, the line controller 50 receives, from the input/output device 30, information indicating a result (evaluation result) of evaluation made by the operator.

In step S202, the line controller 50 registers the received evaluation result in the mold management table.

As described above, when the evaluation result obtained by visual check by the operator who is present in the core setting area is updated by the line controller 50, the pouring permission/non-permission information for each mold is registered in the mold management table, as illustrated in FIG. 6.

Next, pouring control by the line controller 50 based on the mold management table in which the pouring permission/non-permission information has been updated and registered as described above will be described with reference to (b) of FIG. 10.

(b) of FIG. 10 is a flowchart illustrating pouring control over the pouring machine 60 by the line controller 50. Note that some steps may be carried out in parallel or in a different order.

In step S203, the line controller 50 identifies a mold 2 having arrived at the pouring machine 60 based on the mold ID.

In step S204, a pouring permission/non-permission signal for the mold 2 having arrived at the pouring machine is read based on the mold ID, wherein the pouring permission/non-permission signal indicates whether or not to permit pouring into the mold.

In step S205, in a case where the pouring permission/non-permission signal indicates "pouring non-permission", the line controller 50 outputs a pouring non-permission signal to the pouring machine 60 (step S206). Upon receiving this "pouring non-permission" signal, the pouring machine 60 proceeds with the process without carrying out pouring into that mold.

On the other hand, in step S205, in a case where the pouring permission/non-permission signal indicates "pouring permission", the line controller 50 outputs a pouring permission signal to the pouring machine 60 (step S207). Note that, depending on the circumstances, the line controller 50 does not have to output a "pouring permission" signal to the pouring machine 60. This is realized by controlling the pouring machine 60 such that the pouring machine 60 carries out pouring into all of the molds having arrived at the pouring machine 60 unless the pouring machine 60 receives the "pouring non-permission" signal from the line controller 50, since the pouring machine 60 basically operates such that the pouring machine 60 ordinarily carries out pouring into all of the molds having arrived at the pouring machine 60.

In this way, the pouring machine 60 carries out pouring control over the mold 2 having arrived at the position of the pouring machine 60 based on the pouring permission/non-permission signal having been received from the line controller 50. In a case where the received pouring permission/non-permission signal indicates "permission" or where the pouring machine 60 receives no signal, the pouring machine 60 carries out pouring into the mold 2. On the other hand, in a case where the received pouring permission/non-permission signal indicates "non-permission", the pouring machine 60 does not carry out pouring into the mold 2.

Incidentally, in the conventional device, the inspection result of the mold 2 is generally displayed at a place where the inspecting device 20 is installed. Thus, for example, in order for the operator in the core setting area A1 to grasp the inspection result, the operator needs to move to the place where the inspecting device 20 is installed. In contrast, in this embodiment, the inspection result of the mold 2 located in the vicinity of the display 31 among a plurality of molds 2 conveyed along the conveyance path is displayed on the display 31. Thus, the operator who is present near the display 31 can grasp the inspection result of the mold 2 to be worked from the contents displayed on the display 31. As described above, in this embodiment, the inspection result is not immediately displayed, but is displayed at a timing when the mold 2 to be inspected is moved and arrives at the work area (e.g., the core setting area A1) of the downstream step. Displaying the inspection result at a place where the operator works reduces a time required to grasp the inspection result of the mold 2 to be worked.

In Embodiment 1, the display control device 10 is configured as a device separate from the line controller 50. Alternatively, the line controller 50 may have the function of the display control device 10. That is, the line controller 50 and the display control device 10 may be configured as an integral device.

Further, In Embodiment 1, the configuration in which the mold management table is stored in the auxiliary memory of the line controller 50 has been described. Alternatively, the mold management table may be stored in the auxiliary memory 103 of the display control device 10 or may be stored in another device. In Embodiment 2, the configuration in which the inspection result of the mold 2 is stored in the auxiliary memory 103 of the display control device 10 has been described. Alternatively, the inspection result of the mold 2 may be stored in another device without being stored in the display control device 10.

Embodiment 2

Another embodiment of the present invention is described below. This embodiment differs from Embodiment 1 described above in that the mold determination process (process in step S103 in FIG. 8) carried out by the display control device is carried out in a different way. Note that, for convenience of explanation, members having functions identical to those of the respective members described in Embodiment 1 are given respective identical reference signs, and a description of those members is omitted here.

Figure 11:
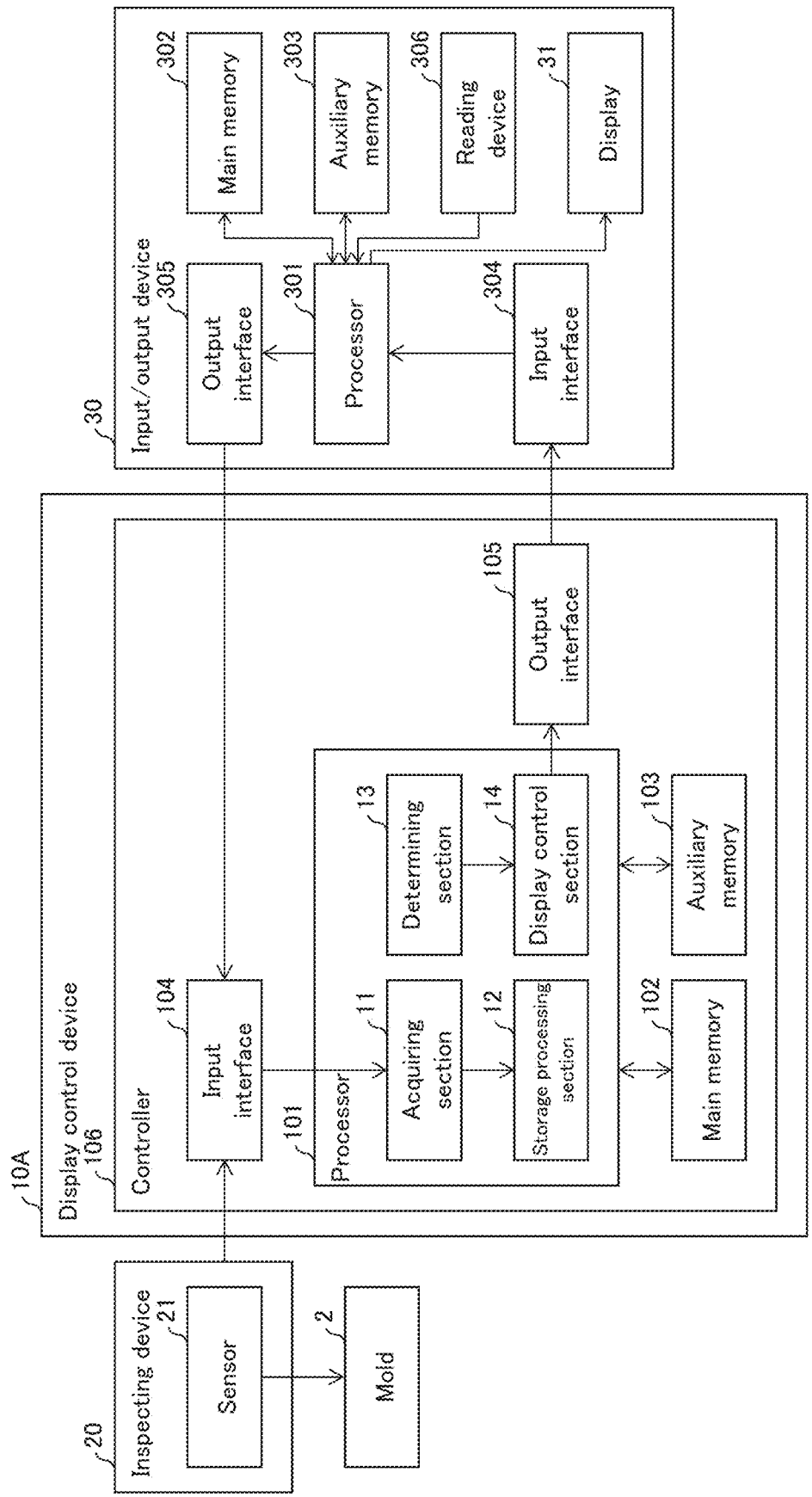
FIG. 11 is a block diagram schematically illustrating a configuration of a display control device in accordance with Embodiment 2 of the present invention.

FIG. 11 is a block diagram illustrating a configuration of a display control device 10A and an input/output device 30 in accordance with this embodiment. In Embodiment 1 described above, the determining section 13 of the display control device 10A determines the mold 2 for which the inspection result is to be displayed on the display 31, based on the position information contained in the mold information. In contrast, in this embodiment, the determining section 13 determines the mold 2 for which the inspection result is to be displayed on the display 31 among a plurality of molds 2 conveyed along the conveyance path, with use of identification information read by a reading device that reads identification information assigned to each of the molds 2.

In this embodiment, the input/output device 30 is, for example, a laptop personal computer. The input/output device 30 may be a smart phone carried by an operator or a tablet terminal carried by the operator. The input/output device 30 includes a processor 301, a main memory 302, an auxiliary memory 303, an input interface 304, an output interface 305, a reading device 306, and the display 31. The processor 301 is a processor that controls the input/output device 30, and is, for example, a processor such as a microprocessor, a digital signal processor, a microcontroller, or any combination of these processors. The main memory 302 is, for example, a semiconductor RAM. The auxiliary memory 303 is, for example, a flash memory, a hard disk drive (HDD), a solid state drive (SSD), or any combination of these memory and drives. The auxiliary memory 303 stores a program for causing the processor 301 to execute an operation of the input/output device 30. The processor 301 causes a control program stored in the auxiliary memory 303 to be loaded in the main memory 302 and executes instructions contained in the loaded control program.

The reading device 306 reads identification information assigned to a mold 2 which satisfies a predetermined condition of a positional relation to the display 31. The identification information to be read is, for example, a character string representing an identification number which is marked on a mold 2 (or a molding flask), a two-dimensional bar code, or identification information written on an RFID tag. The reading device 306 is, for example, a camera that captures an image of a two-dimensional bar code and a character string or a reader that reads information from an RFID tag located in the vicinity of the display 31. That is, in this example, the reading device 306 reads identification information assigned to a mold which is located in the vicinity of the display 31. As a reading method, for example, the reading device 306 may read the identification information by capturing an image of a two-dimensional bar code and a character string assigned to a mold 2 (or a molding flask) which is located in front of the display 31.

The input interface 304 obtains the inspection result to be displayed on the display 13 from the display control device 10A. The output interface 305 outputs, to the display control device 10A, the identification information having been read by the reading device 306. Note that although one input interface 304 and one output interface 105 are illustrated in FIG. 8, the input/output device 30 may include a plurality of input interfaces and/or a plurality of output interfaces.

The identification information having been read by the reading device 306 is outputted to the display control device 10A. The display control device 10A carries out an obtaining process in which the identification information is obtained from the input/output device 30. The identification information to be obtained is the identification information having been read by the reading device 306, that is, the identification information assigned to the mold which is located in the vicinity of the display 31. The display control device 10A obtains, from the auxiliary memory 103, an inspection result corresponding to the identification information having been obtained from the input/output device 30, and then supplies the obtained inspection result to the input/output device 30. The input/output device 30 causes to the inspection result having been obtained from the display control device 10A to be displayed on the display 31.

In this embodiment, the reading device 306 reads identification information assigned to a mold 2 which is located in the vicinity of the input/output device 30, and the display control device 10A causes an inspection result of the mold 2 corresponding to the read identification information to be displayed on the display 31. This allows the operator to grasp the inspection result of the mold 2 to be worked from the contents displayed on the display 31.

Embodiment 3

Another embodiment of the present invention is described below. Note that, for convenience of explanation, members having functions identical to those of the respective members described in Embodiments 1 and 2 are given respective identical reference signs, and a description of those members is omitted here. In this embodiment, the display control device 10 is, for example, a smart phone carried by an operator or a tablet terminal carried by the operator. In Embodiment 1 described above, the determining section 13 of the display control device 10 determines the mold 2 for which the inspection result is to be displayed on the display 31, based on the position information contained in the mold information. In contrast, in this embodiment, the determining section 13 of the display control device 10 determines an inspection result to be displayed on the display 31 with use of identification information assigned to a mold 2 (or a molding flask). Note that, in Embodiment 3, the inspection result of the mold 2 is not stored in the display control device 10, but is stored in the casting management table of the line controller 50.

The display control device 10 includes a reading device. The reading device reads identification information assigned to a mold 2 (or a molding flask). The identification information to be read is, for example, a character string marked on a mold 2 (or a molding flask), a two-dimensional bar code, or identification information written on an RFID tag. The reading device is, for example, a camera that captures an image of a two-dimensional bar code and a character string or a reader that reads information from an RFID tag located in its vicinity.

The reading device reads the identification information assigned to the mold 2 (or the molding flask) which is located in its vicinity. The display control device 10 transmits a request for obtaining an inspection result to be displayed to the line controller 50 via a communication interface (not illustrated). This obtaining request contains the identification information having been read by the reading device. Upon receiving the obtaining request, the line controller 50 searches the mold management table stored in the line controller 50 for the identification information contained in the received obtaining request, and retrieves inspection result data which is associated with the identification information for which the mold management table has been searched. The line controller 50 transmits, to the display control device 10, the retrieved inspection result data. Upon receiving the inspection result data from the line controller 50, the display control device 10 causes an inspection result indicated by the received inspection result data to be displayed on the display 31. In this way, the inspection result of the mold 2 corresponding to the identification information having been read by the reading device is displayed on the display 31.

In this embodiment, even in a case where the operator moves with the display control device 10 on him/her, the inspection result of the mold 2 located in the vicinity of the position of a destination to which the operator has moved is displayed on the display 31. The operator can grasp the inspection result of the mold 2 to be worked from the contents displayed on the display 31.

Embodiment 4

Another embodiment of the present invention is described below. This embodiment differs from Embodiment described above in that the inspection result display control process carried out by the display control device 10 is carried out in a different way. Note that, for convenience of explanation, members having functions identical to those of the respective members described in Embodiment are given respective identical reference signs, and a description of those members is omitted here.

Figure 12:
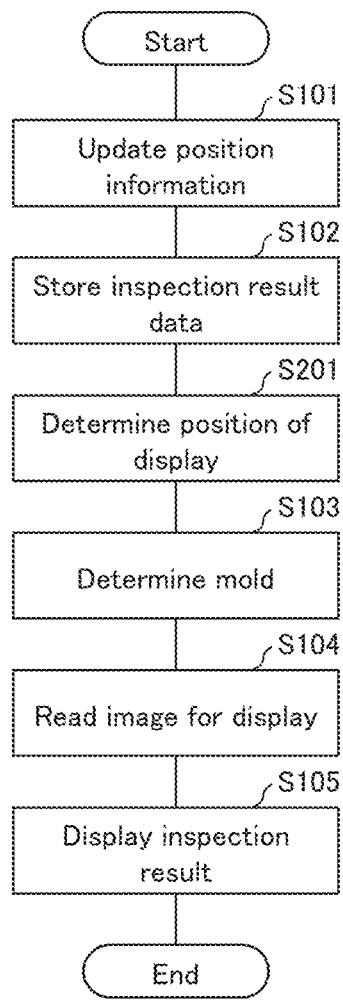
FIG. 12 is a flowchart illustrating an example of a flow of an inspection result display control process in accordance with Embodiment 4 of the present invention.

FIG. 12 is a flowchart illustrating an example of a flow of an inspection result display control process carried out by the display control device 10 and the line controller 50. The process illustrated in FIG. 12 differs from the process described in Embodiment 1 above and illustrated in FIG. 8 in that the operation in step S201 is carried out between step S102 and step S103. Note that some steps may be carried out in parallel or in a different order.

In step S201, the display control device 10 carries out a position determination process in which the position of the display 31 is determined. As a position determining method, for example, an operator enters information indicative of the position of the display 31 by use of the input/output device 30, and the display control device 10 obtains the entered information and determines the position of the display 31 with use of the obtained information. As another example, for example, the display control device 10 may carry out the position determining in accordance with a GPS signal received by the display 31.

In step S103, the determining section 13 determines a mold 2 satisfying a predetermined condition of a positional relation to the position of the display 3 determined in step S201. In this embodiment, for example, even in a case where the display 31 is moved, an inspection result of a mold 2 located in the vicinity of the display 31 is displayed on the display 31. This allows the operator who is present near the display 31 to grasp the inspection result of the mold 2 to be worked from the contents displayed on the display 31.

Embodiment 5

Another embodiment of the present invention is described below. Note that, for convenience of explanation, members having functions identical to those of the respective members described in Embodiments 1 to 4 are given respective identical reference signs, and a description of those members is omitted here.

This embodiment differs from Embodiment 1 described above in that details of the inspection process carried out by the display control device 10 are different, and, depending on the contents of an inspection result details of control, the line controller 50 changes how to carry out control in a subsequent step. In this embodiment, the display control device 10 inspects a mold 2 for mold drop by analyzing an image, captured by the sensor 21, of the mold 2. Further, by evaluating whether or not a region in which a mold drop has been detected in the captured image of the mold 2 is contained in local regions specified in advance, the display control device 10 evaluates whether or not a casting formed with use of the mold 2 is repairable or irreparable.

The occurrence of a mold drop on a mold 2 may cause a casting formed with use of such a mold 2 to have chipping or the like failure. However, even in a case where chipping or the like failure has occurred in the formed casting, the casting may be repairable depending on a location where the failure has occurred. In this embodiment, the line controller 50 carries out control such that casting production is carried out with use of a mold 2 having a mold drop in a case where a resulting casting would be repairable, while pouring is not carried out into a mold in which a mold drop has occurred in a case where a resulting casting would be irreparable.

Figures 13, 14:
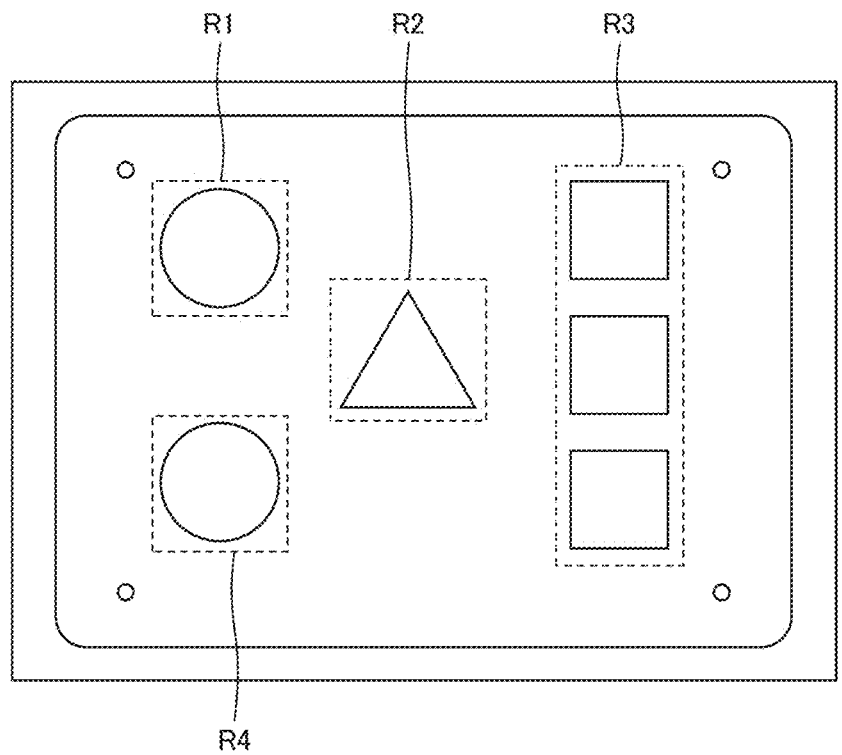
FIG. 13 is a view illustrating an example of local regions in accordance with Embodiment 5 of the present invention.
FIG. 14 is a diagram illustrating an example of contents of a repair evaluation table in accordance with Embodiment 5 of the present invention.

FIG. 13 is a view illustrating an example of local regions. In the example illustrated in FIG. 13, local regions R1 to R4 are set. The local regions are preset for each pattern code. In addition, whether a casting would be repairable or irreparable is set for each local region. Information on local regions for each mold formation pattern and information on whether or not a casting would be repairable are registered and changed by an operator or the like in the molding system 1.

FIG. 14 is a diagram illustrating an example of contents of a repair evaluation table in which whether a casting would be repairable or irreparable is set for each local region. This repair evaluation table is stored in, for example, a memory of the display control device 10. In the repair evaluation table, the items of "pattern code", "local region", and "repairable/irreparable" are associated with each other. Of these items, the item "pattern code" stores identification information by which a mold formation pattern for use in the production of a mold 2 is identified. The item "local region" stores identification information by which a local region set for a corresponding mold formation pattern is identified. In the example illustrated in FIG. 14, local regions R1 to R4 are set as local regions for a mold formation pattern with a pattern code "A".

The item "repairable/irreparable" stores information indicative of, whether a casting produced with use of a mold 2 with a mold drop in its corresponding local region would be repairable (hereinafter referred to as "repairability information"). In the example illustrated in FIG. 14, a value of "repairable" or a value of "irreparable" is set. The value of "repairable" indicates that it is repairable. The value of "irreparable" indicates that it is irreparable.

In the example illustrated in FIG. 14, for example, in a case where a mold drop has been detected in the local region R3, the display control device 10 determines, as an inspection result, that a resulting casting would be irreparable. On the other hand, in a case where a mold drop has been detected in the local region R1, R2, or R4, the display control device 10 determines, as an inspection result, that although the mold drop has occurred, a resulting casting would be repairable. Thereafter, at a timing when the mold 2 is moved to the core setting area A1, the contents of the inspection result indicated by the inspection result data are displayed on the display 31.

Further, the line controller 50 transmits, to the pouring machine 60, a control signal instructing that pouring is carried out into a mold 2 with which a repairable casting is formed, while pouring is not carried out into a mold 2 with which an irreparable casting is formed. The pouring machine 60 carries out pouring control over the mold 2 in accordance with the control signal received from the line controller 50.

In a case where a mold drop has occurred in the mold 2, a resulting casting may be repairable depending on a region where the mold drop has occurred. Further, in a case where a mold drop has occurred in a specific region, a casting formed with use of such a mold may be irreparable. Thus, whether a casting formed with use of a mold 2 having a mold drop is repairable or irreparable depends on which part of the mold 2 the mold drop has occurred in. Conventionally, a determination as to whether or not a casting formed with use of a mold 2 having a mold drop is repairable has been made by a visual check by an operator. In contrast, in this embodiment, prior to the pouring, the display control device 10 can evaluate whether or not the casting would be irreparable, and causes an evaluation result to be presented to an operator or the like on the display 31.

In this embodiment, the line controller 50 may carry out pouring control according to a local region in which the occurrence of a mold drop has been detected. For example, the line controller 50 may carry out control over the pouring machine 60 such that pouring is not carried out in a local region in which a mold drop has been detected, while pouring is carried out in the other regions only. The pouring machine 60 carries out control such that pouring is not carried out in the specified local regions in accordance with the control signal received from the line controller 50.

Embodiment 6

Another embodiment of the present invention is described below. Note that, for convenience of explanation, members having functions identical to those of the respective members described in Embodiments 1 to 5 are given respective identical reference signs, and a description of those members is omitted here.

Figure 15:
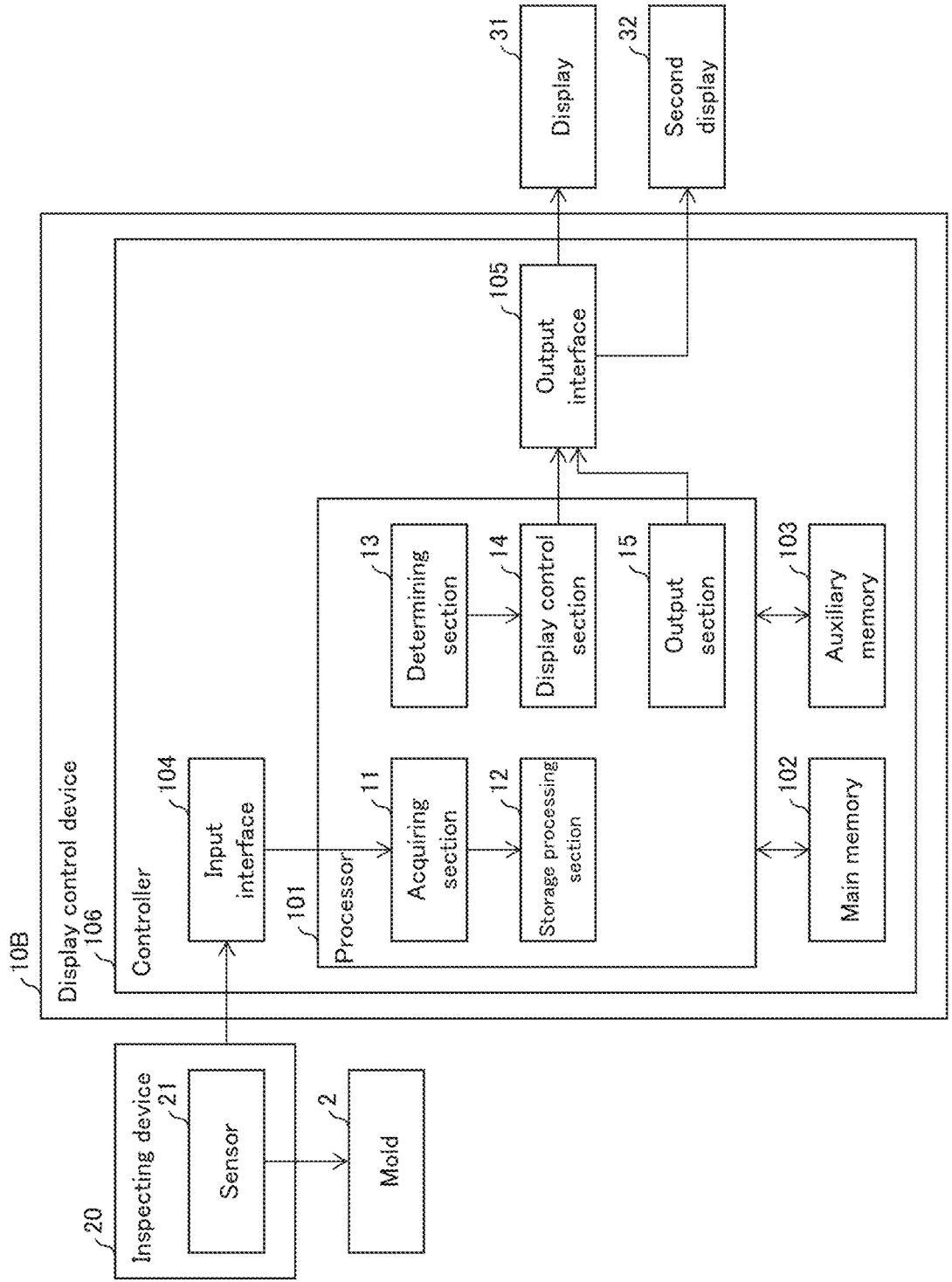
FIG. 15 is a block diagram schematically illustrating a configuration of a display control device in accordance with Embodiment 6 of the present invention.

FIG. 15 is a block diagram schematically illustrating a configuration of a display control device 10B in accordance with the present embodiment. The display control device 10B differs from the display control device 10 in accordance with Embodiment 1 described above in that the display control device 10B further has an output section 15.

The output section 15 carries out an output process in which all or part of inspection results of individual molds, which inspection results are stored in the auxiliary memory 103, are outputted to a second display 32 different from the display 31. The second display 32 is installed at a place (e.g., a management office) different from a work area where a mold 2 is conveyed. In this embodiment, the output section 15 outputs, to the second display 32, one or more inspection results satisfying a predetermined condition among the inspection results stored in the auxiliary memory 103. The predetermined condition is, for example, a condition that the inspection result indicates no good, a condition that the inspection result indicates no good but repairable, or a condition that the inspection result indicates no good and irreparable.

According to this embodiment, all or part of the inspection results of the individual molds which inspection results are stored in the auxiliary memory 103 are displayed on the second display 32. Therefore, the display control device 10B can cause all or part of the inspection results about the molds 2 to be presented to, for example, a manager of a casting line by means of the second display 32.

Figure 16:
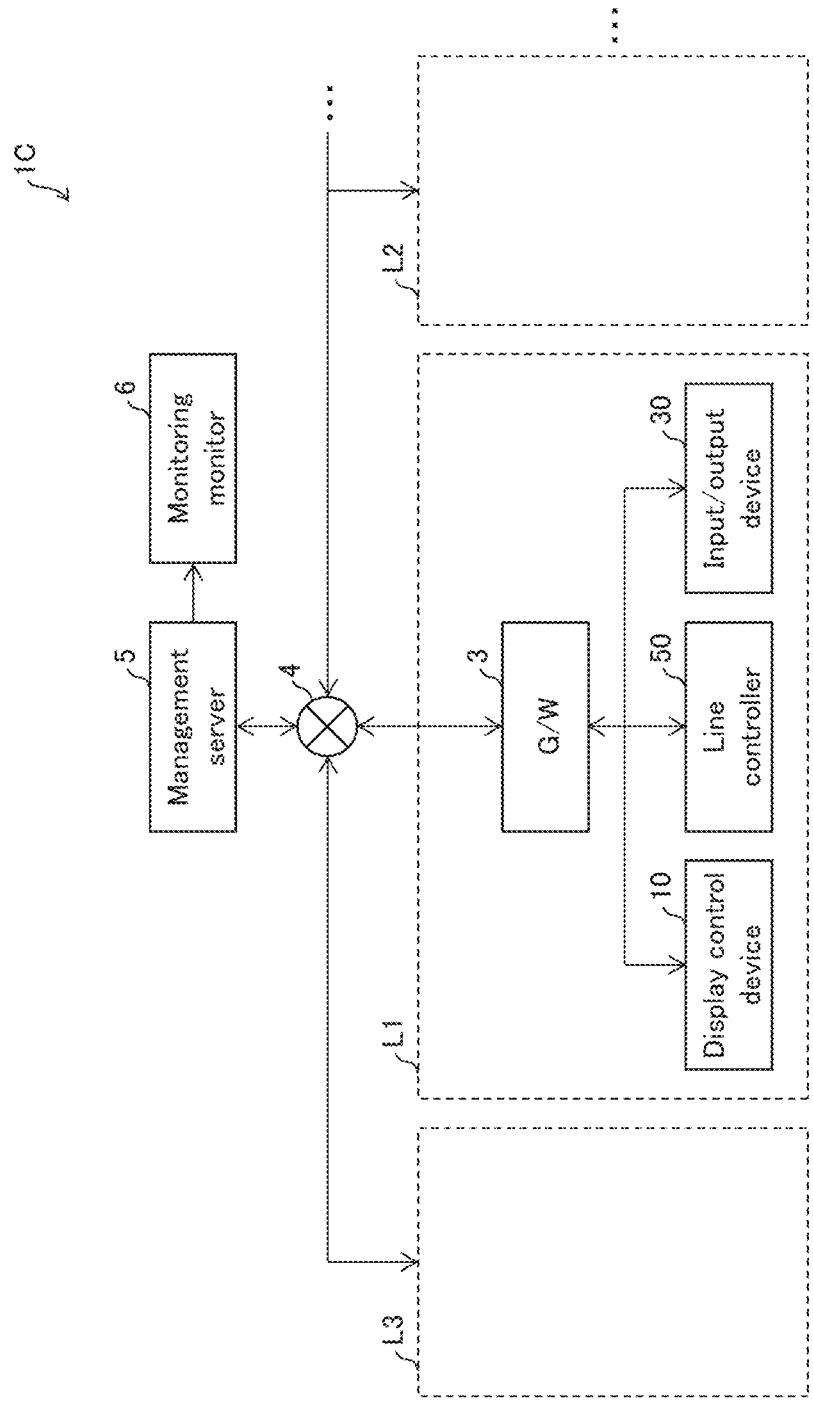
FIG. 16 is a diagram schematically illustrating a configuration of a molding system in accordance with Embodiment 7 of the present invention.

FIG. 16 is a diagram schematically illustrating a configuration of a molding system 1C in accordance with the present embodiment. In an example illustrated in FIG. 16, a plurality of casting lines L1, L2, L3, . . . are provided together in one factory. Each of the casting lines L1, L2, L3, . . . includes the casting system 1 illustrated in FIG. 2. Particularly, each of the casting lines L1, L2, L3, . . . includes a display control device 10, an input/output device 30, a line controller 50, and a gateway GW. The display control device 10, the input/output device 30, and the line controller 50 are similar to those in Embodiment 1 described above.

Data stored in the display control device 10, data stored in the line controller 50, data stored in the input/output device 30 are integrated, organized, and managed in the management server 5 of the factory through the gateway GW and the network 4.

A state of the integrated and managed data in the management server 5 is displayed as traceability data including current data or past data on a monitoring monitor 6 of, for example, a personal computer (PC) for factory management or a mobile terminal for factory management. The data displayed on the monitoring monitor include operating statuses of the individual lines, occurrence status of mold drops (a failure rate, etc.), analyzed failure causes, advice on measures, and others. For example, in addition to a total failure rate in each of the lines in the factory, the presence or absence of mold drops, and when a mold drop has occurred in which of the lines are graphically displayed.

As for information indicative of the occurrence of a mold drop, other information on the mold 2 are also displayed, including, for example, external information such as sand property data on the mold 2, control data during mold formation, mold strength determination result data, an ambient temperature, and a temperature, and an actual inspection result image.

The traceability data can be used, for example, to display a past failure rate and a failure incidence rate of mold drops in a total number of failures and to provide advice on measures.

Embodiment 8

Figure 17:
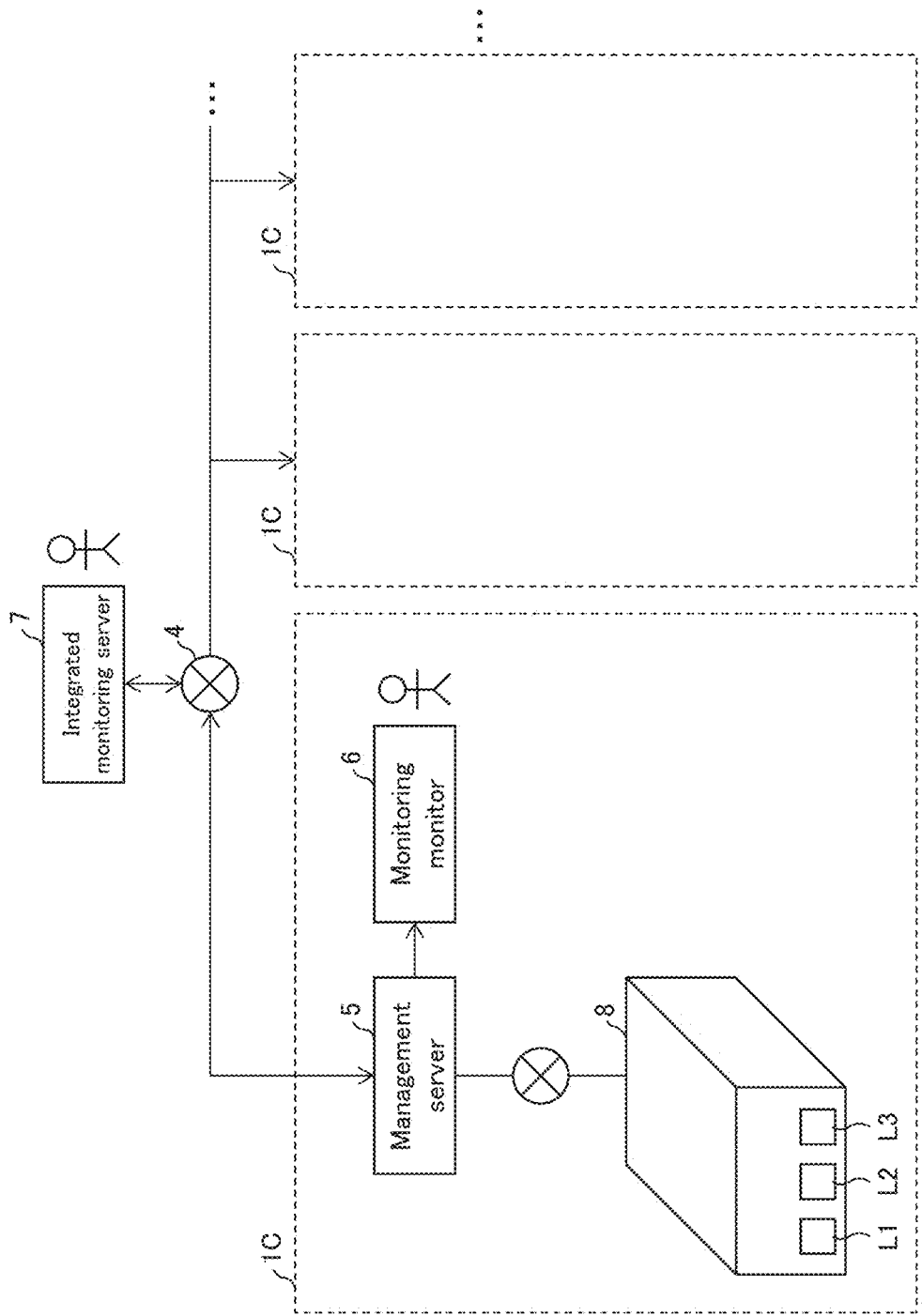
FIG. 17 is a diagram schematically illustrating a configuration of a molding system in accordance with Embodiment 8 of the present invention.

FIG. 17 is a diagram schematically illustrating a casting system 1D in accordance with the present embodiment. The casting system 1D includes a plurality of casting systems 1C each including a plurality of casting lines in one factory 8. In each of the casting systems 1C, management is carried out for each casting line. The casting systems 1C include their respective management servers 5 which are connected to an integrated monitoring server 7 via a network 4. The integrated monitoring server 7 receives data from the plurality of management servers 5 and organizes and manages the data.

The present embodiment enables monitoring of a plurality of factories each including a plurality of lines. In this case, the management of the individual factories is similar to that in Embodiment 7 described above.

In the management of multiple factories, various data organized and stored in the integrated monitoring server 7 in each factory are collected in the management server 5 of each factory 8 via the network 4. The various data thus collected are organized and stored so that a failure rate and occurrence status of mold drops can be monitored, for example, through the screen in each factory 8, as in Embodiment 7.

[Variations]

In each of the above-described embodiments, the display control device 10 carries out a process in which a defective part is identified by generating a subtraction image that represents a difference between a captured image of the mold 2 and a pre-registered reference image, and detecting a mass within the generated subtraction image. Specifics of the inspection process carried out by the display control device 10 are not limited to those presented in the above-described embodiments. For example, the display control device 10 (or other device) may carry out inspection of molds 2 by machine learning. In this case, the display control device 10 (or other device) generates a learned model obtained by machine learning of, with use of a set of captured image data items representing captured images of molds 2 and respective inspection results corresponding to the captured image data items, correlations between the captured image data items and the inspection results. Thereafter, the display control device 10 (or other device) predicts an inspection result by using the generated learned model. The learned model can be realized by, for example, a model having a convolutional neural network (CNN) structure.

In this case, the image data obtained by image capture by the sensor 21 is inputted, as input data, to the learned model. The learned model is constituted by, for example, convolution layers, pooling layers, and a connected layer. In the convolution layers, the input data is subjected to information convolution by filtering. The data having been subjected to convolution is subjected to a pooling process in the pooling layers. This allows the model to improve the capability of recognition of positional changes of features in the data. The data having undergone the pooling process is processed in the connected layer to be converted into a form of output data from the learned model, that is, a form of a defect inspection result of the mold 2, and is then outputted.

That is, by passing the image data inputted to the learned model through the above-described layers in the order described above, the defect inspection result of the mold 2 is outputted. Note that the learned model is not limited to a model having the CNN structure. As the learned model, for example, a recurrent neural network (RNN) model, such as a multi timescale RNN (MTRNN) model and a long short term memory (LSTM) model, an autoregressive, integrated and moving average (ARIMA) model, and other models may be used.

In Embodiment 5 described above, an operator or the like in the casting system 1 sets a local region which would cause an irreparable casting. A method of setting the local region which would cause an irreparable casting is not limited to the method presented in the above-described embodiment. For example, the display control device 10 (or other device) may determine the local region which would cause an irreparable casting by machine learning. In this case, the display control device 10 (or other device) generates a learned model obtained by machine learning of, with use of a set of captured image data items representing captured images of molds 2 and respective local region data items, corresponding to the captured image data items, representing local regions which would cause irreparable castings, correlations between the captured image data items and the local region data items. Thereafter, the display control device 10 (or other device) predicts a local region which would cause an irreparable casting by using the generated learned model. The learned model can be realized by, for example, a model having a CNN structure.

In this case, the image data obtained by image capture by the sensor 21 is inputted, as input data, to the learned model. The learned model is constituted by, for example, convolution layers, pooling layers, and a connected layer. In the convolution layers, the input data is subjected to information convolution by filtering. The data having been subjected to convolution is subjected to a pooling process in the pooling layers. This allows the model to improve the capability of recognition of positional changes of features in the data. The data having undergone the pooling process is processed in the connected layer to be converted into a form of output data from the learned model, that is, a form of a repairable/irreparable evaluation result of the mold 2, and is then outputted.

That is, by passing the image data inputted to the learned model through the above-described layers in the order described above, the repairable/irreparable evaluation result is outputted. Note that the learned model is not limited to a model having the CNN structure. As the learned model, for example, a RNN model, such as an MTRNN model and an LSTM model, an ARIMA model, and other models may be used.

Further, in this aspect, at the time when the operator carries out the local region setting operation, the display control device may present, to the operator, the local region determined as a result of machine learning by, for example, causing the determined local region to be displayed on the display. The operator sets the local region while referring to the displayed result of mechanical learning.

In Embodiment 1 described above, the case where the display 31 is installed in the core setting area A1 has been described. The display 31 may be installed in a place other than the core setting area A1. The display 31 need only to be installed in a downstream step at a destination place of the mold 2 to be inspected. The display 31 may be installed, for example, at a place where pouring is carried out by the pouring machine 60.

The functions implemented by the display control device 10 in the above-described embodiments may be shared and implemented by a plurality of devices. For example, at least part of the functions of the display control device 10 in accordance with Embodiment 1 described above may be implemented on a server in the cloud. In this case, the display control device 10 in accordance with Embodiment 1 described above is realized by communications between the display control device 10 and the server via a network.

In this case, to serve as a mold drop detecting deice, the server not only has the function of arithmetic operation and the function of image data storage, but also analyzes a link between a mold drop and data on sand properties and data during mold formation to prevent the occurrence of a mold drop and provides advice on measures or the like.

The server accumulates, for example, data relating to the inspection of a mold 2 and analysis data obtained from the devices on the lines. The data relating to the inspection of a mold 2 is, for example, an image captured by the inspecting device 20 and a reference image used for the inspection, a composite image in which a mold drop part is marked on an inspection image, and parameters relating to the inspection process. The analysis data are, for example, sand properties before mold formation (CB, moisture, sand temperature, compressive strength, air permeability, etc.), control data during the mold formation (aeration waveform, squeeze pressure waveform, application quantity of a mold release agent, etc.), measured data of the mold strength after the mold formation, and environmental data of the factory (ambient temperature, humidity, etc.). The analysis data on the line is stored in association with inspection data.

Functions provided by the server are, for example, tracking of past failure occurrences (visualization by year, by month, by day or by product, etc.), and prediction of a failure rate and provision of advice on measures based on past accumulated data.

[Example of Configuration Achieved by Software]

Control blocks of the display control device 10, the inspecting device 20, the input/output device 30, the molding machine 40, the line controller 50, the pouring machine 60, and the conveying device 70 (particularly, the acquiring section 11, the storage processing section 12, the determining section 13, the display control section 14, and the output section 15) can be realized by a logic circuit (hardware) provided in an integrated circuit (IC chip) or the like. Alternatively, control blocks of the display control device 10, the inspecting device 20, the input/output device 30, the molding machine 40, the line controller 50, the pouring machine 60, and the conveying device 70 can be realized by software.

In the latter case, the display control device 10, the inspecting device 20, the input/output device 30, the molding machine 40, the line controller 50, the pouring machine 60, and/or the conveying device 70 each includes a computer that executes instructions of a program that is software realizing the foregoing functions. The computer includes, for example, at least one processor. The computer also includes at least one computer-readable storage medium in which the program is stored. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

[Remarks]

The present invention is not limited to the embodiments, but can be altered within the scope of the claims. The present invention also encompasses, in its technical scope, any embodiment derived by combining technical means included in differing embodiments.

Aspects of the present invention can also be expressed as follows:

In order to solve the above-described problem, a display control device in accordance with Aspect 1 of the present invention includes a controller. The controller is configured to carry out: a storage process in which inspection results are stored in a memory, the inspection results being each obtained by an inspection of each of a plurality of molds conveyed along a conveyance path, the inspection being carried out based on image data containing each of the plurality of molds as a subject; a determination process in which one or more molds satisfying a predetermined condition of a positional relation to a display are determined from among the plurality of molds conveyed along the conveyance path; and a display control process in which one or more inspection results of the respective one or more molds having been determined in the determination process are displayed on the display.

With the above configuration, one or more inspection results of the respective one or more molds satisfying the predetermined condition of the positional relation to the display among a plurality of molds conveyed along the conveyance path is displayed on the display. This allows an operator who is present in a position where the operator can view the display to grasp the inspection result(s) of the mold(s) to be worked from the contents displayed on the display, without the need to move from that position.

In Aspect 1 of the present invention, a display control device in accordance with Aspect 2 of the present invention may be arranged such that identification information and position information are stored in the memory such that the identification information and the position information are associated with each other, wherein the identification information identifies each of the molds, and the position information indicates a position of each of the molds on the conveyance path, the controller is configured to further carry out an update process in which, each time the plurality of molds are moved on the conveyance path, the position information which is associated with the identification information of each of the molds is updated, and in the determination process, the controller determines, to be the one or more molds satisfying the predetermined condition, one or more molds with which the position information indicative of a position in the vicinity of the display is associated.

With the above configuration, the position information indicative of the position of the mold on the conveyance path is associated with the inspection result, and the position information associated with the inspection result is updated with the movement of the mold. This facilitates the process in which a mold located in the vicinity of the display is determined.

In Aspect 1 of the present invention, a display control device in accordance with Aspect 3 of the present invention may be arranged such that the controller is configured to further carry out an obtaining process in which identification information assigned to one or more molds located in the vicinity of the display is obtained, and in the determination process, the controller determines, to be the one or more molds satisfying the predetermined condition, the one or more molds to which the identification information having been obtained in the obtaining process is assigned.

With the above configuration, the display control device obtains the identification information of the mold for which the inspection result is to be displayed, and causes the inspection result(s) of the mold(s) to which the obtained identification information is assigned to be displayed on the display. This allows the display control device to easily determine the mold(s) for which the inspection result(s) is to be displayed.

In Aspects 1 to 3 of the present invention, a display control device in accordance with Aspect 4 of the present invention may be arranged such that the controller further carries out a position determination process in which a position of the display is determined.

With the above configuration, in Aspect 4, for example, even in a case where the display is moved, it is possible to determine the mold(s) located in the vicinity of the display.

In Aspects 1 to 4 of the present invention, a display control device in accordance with Aspect 5 of the present invention may be arranged such that the controller further carries out an output process in which all or part of the inspection results of the individual molds, which inspection results are stored in the memory, are outputted to another display different from the display.

With the above configuration, all or part of the inspection results stored in the memory are displayed on the second display different from the above-described display. Thus, in Aspect 5, it is possible to cause all or part of the inspection results to be presented for, for example, a manager of a casting line by means of the second display.

In Aspects 1 to 5 of the present invention, a display control device in accordance with Aspect 6 of the present invention may be arranged such that the inspection results are inspection results each obtained by the inspection which is performed on a corresponding one of the molds for mold drop by analyzing the image data, and in a case where the corresponding one of the molds is such that a region in which a mold drop has been detected in an image represented by the image data is contained in predetermined local regions, the controller evaluates that a casting formed with use of the corresponding one of the molds is irreparable.

The above configuration allows the display control device to evaluate whether or not a casting formed with use of each of the molds is irreparable.

In Aspects 1 to 6 of the present invention, a display control device in accordance with Aspect 7 of the present invention may be arranged such that the controller includes: at least one processor configured to carry out each of the foregoing processes in accordance with a predetermined program; and at least one memory storing the program.

With the above configuration, one or more inspection results of the respective one or more molds satisfying the predetermined condition of the positional relation to the display among a plurality of molds conveyed along the conveyance path is displayed on the display. This allows an operator who is present in a position where the operator can view the display to grasp the inspection result(s) of the mold(s) to be worked from the contents displayed on the display, without the need to move from that position.

A computer-readable non-transitory storage medium in accordance with Aspect 8 of the present invention stores a control program for controlling the display control device described in Aspect 1, the control program causing the controller to carry out each of the foregoing processes.

The present invention also encompasses a control program for controlling the display control device described in Aspect 1 and a computer-readable non-transitory storage medium in which the control program is stored.

REFERENCE SIGNS LIST 1 casting system
2 mold
10, 10A, 10B display control device
11 acquiring section
12 storage processing section
13 determining section
14 display control section
15 output section
20 inspecting device
21 sensor
30 input/output device
31 display
32 second display
40 molding machine
50 line controller
60 pouring machine
70 conveying device
101, 301 processor
102, 302 main memory
103, 303 auxiliary memory
104, 304 input interface
105, 305 output interface
306 reading device
A1 core setting area f1 to f3 rectangular image
G1 screen
P1 to P19 positions
R1 to R4 local regions

The invention claimed is:

1. A display control device comprising:
a controller, the controller being configured to carry out,
a storage process in which inspection results are stored in a memory, the inspection results being each obtained by an inspection of each of a plurality of molds conveyed along a conveyance path, the inspection being carried out based on image data containing each of the plurality of molds as a subject, the image data being obtained by an image captured in an inspection area at a position on the conveyance path,
a determination process in which one or more molds that are closer to a display the other molds are determined from among the plurality of molds conveyed along the conveyance path, the display being at a position downstream of the inspection area in a conveyance direction of the plurality of molds, and
a display control process in which one or more inspection results of the respective one or more molds having been determined in the determination process are displayed on the display.

2. The display control device according to claim 1, wherein
identification information and position information are stored in the memory such that the identification information and the position information are associated with each other, wherein the identification information identifies each of the molds, and the position information indicates a position of each of the molds on the conveyance path,
the controller is configured to further carry out an update process in which, each time the plurality of molds are moved on the conveyance path, the position information which is associated with the identification information of each of the molds is updated, and
in the determination process, the controller determines, to be the one or more molds closer to the display than other molds, one or more molds with which the position information indicative of a position in the vicinity of the display is associated.

3. The display control device according to claim 1, wherein
the controller is configured to further carry out an obtaining process in which identification information assigned to one or more molds located in the vicinity of the display is obtained, and
in the determination process, the controller determines, to be the one or more molds closer to the display than other molds, the one or more molds to which the identification information having been obtained in the obtaining process is assigned.

4. The display control device according to claim 1, wherein
the controller is configured to further carry out a position determination process in which a position of the display is determined.

5. The display control device according to claim 1, wherein
the controller is configured to further carry out an output process in which all or part of the inspection results of each mold, which inspection results are stored in the memory, are outputted to another display different from the display.

6. The display control device according to claim 1, wherein
the inspection results are inspection results each obtained by the inspection which is performed on a corresponding one of the molds for mold drop by analyzing the image data, and
in a case where the corresponding one of the molds is such that a region in which a mold drop has been detected in an image represented by the image data is contained in predetermined local regions, the controller evaluates that a casting formed with use of the corresponding one of the molds is irreparable.

7. The display control device according to claim 1, wherein
the controller comprises:
at least one processor configured to carry out each of the storage process, the determination process, and the display control process in accordance with a predetermined program; and
at least one memory storing the predetermined program.

8. A computer-readable non-transitory storage medium storing a control program for controlling the display control device recited in claim 1, the control program causing the controller to carry out each of the storage process, the determination process, and the display control process.

9. The display control device according to claim 1, wherein the controller is further configured to carry out a pouring process in which the controller outputs a signal for a respective mold of the plurality of molds to carry out pouring the respective mold, the signal being based on the inspection results for the respective mold.

* * * * *